United States Patent
Barada et al.

(10) Patent No.: US 9,734,858 B2
(45) Date of Patent: Aug. 15, 2017

(54) OPTICAL INFORMATION RECORDING/REPRODUCTION METHOD AND DEVICE

(75) Inventors: Daisuke Barada, Utsunomiya (JP); Kiyonobu Tamura, Tsukuba (JP); Takashi Fukuda, Tsukuba (JP)

(73) Assignee: UTSUNOMIYA UNIVERSITY, Utsunomiya-shi, Tochigi (JP)

( * ) Notice: Subject to any disclaimer, the term of this patent is extended or adjusted under 35 U.S.C. 154(b) by 1578 days.

(21) Appl. No.: 12/996,701

(22) PCT Filed: Mar. 13, 2009

(86) PCT No.: PCT/JP2009/054932
§ 371 (c)(1),
(2), (4) Date: Apr. 22, 2011

(87) PCT Pub. No.: WO2009/150880
PCT Pub. Date: Dec. 17, 2009

(65) Prior Publication Data
US 2011/0188368 A1    Aug. 4, 2011

(30) Foreign Application Priority Data
Jun. 8, 2008    (JP) .................... 2008-149997

(51) Int. Cl.
G11B 7/00    (2006.01)
G11B 7/0065    (2006.01)
(Continued)

(52) U.S. Cl.
CPC .......... *G11B 7/0065* (2013.01); *G11B 7/1365* (2013.01); *G11B 7/1369* (2013.01);
(Continued)

(58) Field of Classification Search
None
See application file for complete search history.

(56) References Cited

U.S. PATENT DOCUMENTS 5,751,243 A * 5/1998 Turpin ................ G01S 7/20
                                                    250/370.08
6,512,733 B1    1/2003 Kawano et al.
(Continued)

FOREIGN PATENT DOCUMENTS

JP    04-176031 A    6/1992
JP    05-045811 A    2/1993
(Continued)

OTHER PUBLICATIONS

Barada, Daisuke, et al., "Polarization Recording in Azobenzene Polymer Film for Optical Storage," Technical Digest, Th-I-04, 2006 Nen Hikari Memory Kokusai Kaigi (International Symposium on Optical Memory 2006 (ISOM '06)), Oct. 15, 2006, pp. 122-123.
(Continued)

*Primary Examiner* — Jennifer Mehmood
*Assistant Examiner* — Carl Adams
(74) *Attorney, Agent, or Firm* — Drinker Biddle & Reath LLP

(57) ABSTRACT

It is possible to provide a new information recording/reproduction method and a device which can realize a small-size large-capacity memory having a characteristic equivalent to or higher than a hologram memory. The optical information recording/reproduction device includes: recording light generator (51) which generates a recording light (55) in a polarization state having two mutually orthogonal polarization components with a phase difference at an arbitrary polarization base; reproduction light generator (61) which generates a reproduction light (65) in a polarization state having only a single polarization component at a arbitrary polarization basis; recording medium (71) in which optical information is recorded by recording light (55) and the recorded optical information is reproduced by reproduction light; and optical information detector (polarimeter 81)

(Continued)

which retrieves information light (72) after being applied to recording medium (71) and detects the light as optical information. Provided is also an optical information recording/reproduction method using the device.

24 Claims, 13 Drawing Sheets

(51) Int. Cl.
  *G11B 7/1365* (2012.01)
  *G11B 7/1369* (2012.01)
  *G11B 7/12* (2012.01)

(52) U.S. Cl.
  CPC ..... *G03H 2222/31* (2013.01); *G03H 2222/34* (2013.01); *G11B 7/12* (2013.01)

(56) References Cited

U.S. PATENT DOCUMENTS

| | | | | |
|---|---|---|---|---|
| 6,940,801 | B1* | 9/2005 | Ishii | G11B 7/0045 365/120 |
| 7,065,032 | B2 | 6/2006 | Horimai | |
| 7,903,309 | B2 | 3/2011 | Horimai | |
| 2005/0152540 | A1* | 7/2005 | Barbosa | H04L 9/0858 380/28 |
| 2008/0165643 | A1* | 7/2008 | Takeda | G11B 7/005 369/53.2 |
| 2008/0279082 | A1* | 11/2008 | Shin | G11B 7/1275 369/112.03 |
| 2009/0168629 | A1* | 7/2009 | Bae | G11B 7/0065 369/103 |

FOREIGN PATENT DOCUMENTS

| | | |
|---|---|---|
| JP | 11-238251 A | 8/1999 |
| JP | 2000-082213 A | 3/2000 |
| JP | 2002-83431 A | 3/2002 |
| JP | 2002-298465 A | 10/2002 |
| JP | 2008-186534 A | 8/2008 |
| WO | WO 2004-102542 | 11/2004 |

OTHER PUBLICATIONS

Fukuda, Takashi, et al., "Numerical Analysis of Photoinduced Chirality in Azobenzene Polymer and its Application as Photoaddressable Polarization Altering Elements," Japanese Journal of Applied Physics, vol. 47, No. 2, 2008, pp. 1196-1202, The Japan Society of Applied Physics, Feb. 15, 2008.

Barada, Daisuke, et al., "Azobenzene Hakumaku eno Henko Isosa Joho no Kiroku to Saisei-Riron," Dai 55 Kai Extended Abstracts, Japan Society of Applied Physics and Related Societies, No. 3, Mar. 27, 2008, p. 1329 ( with attached English-language translation).

* cited by examiner

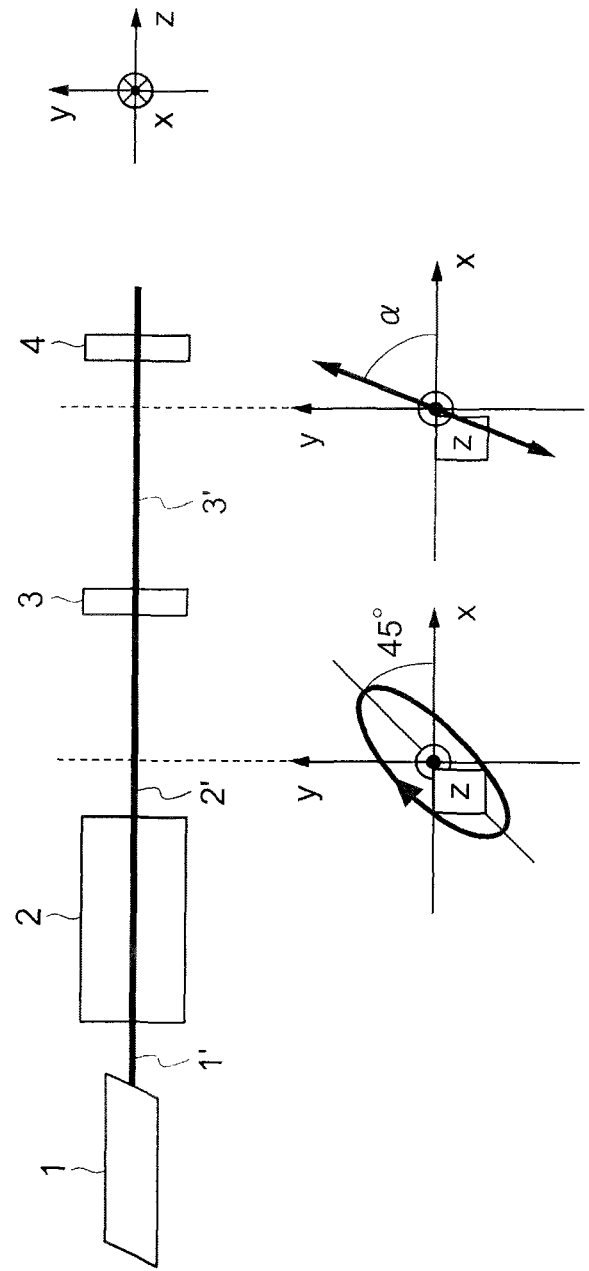

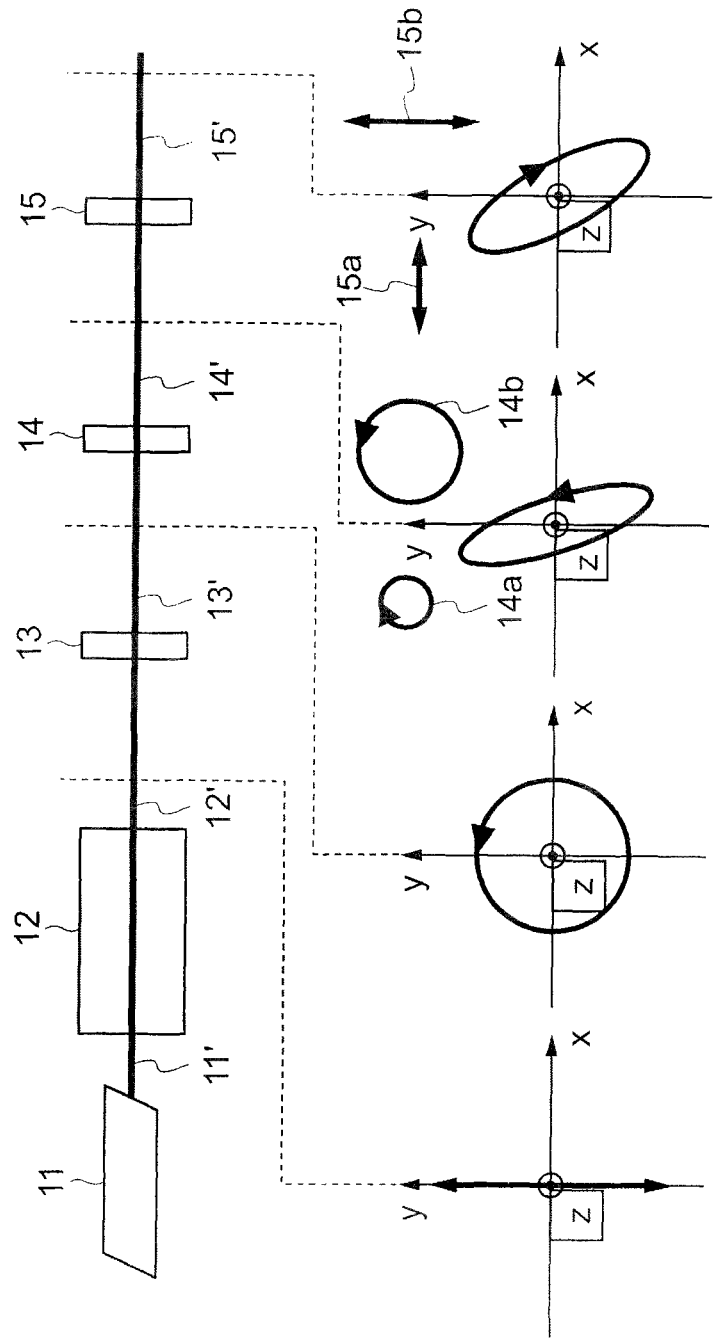

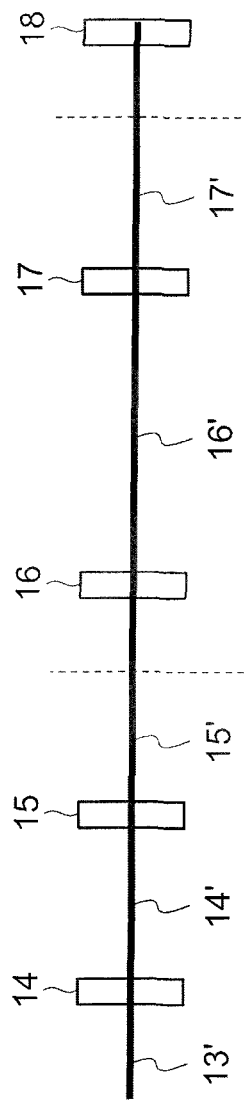
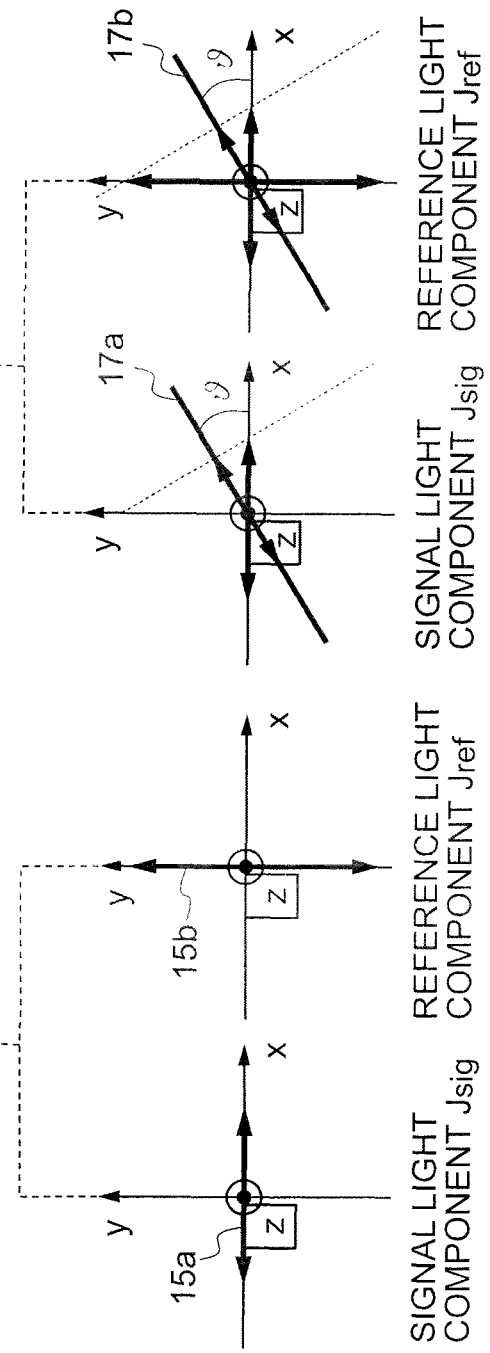
Fig. 4A
Fig. 4B
Fig. 4C

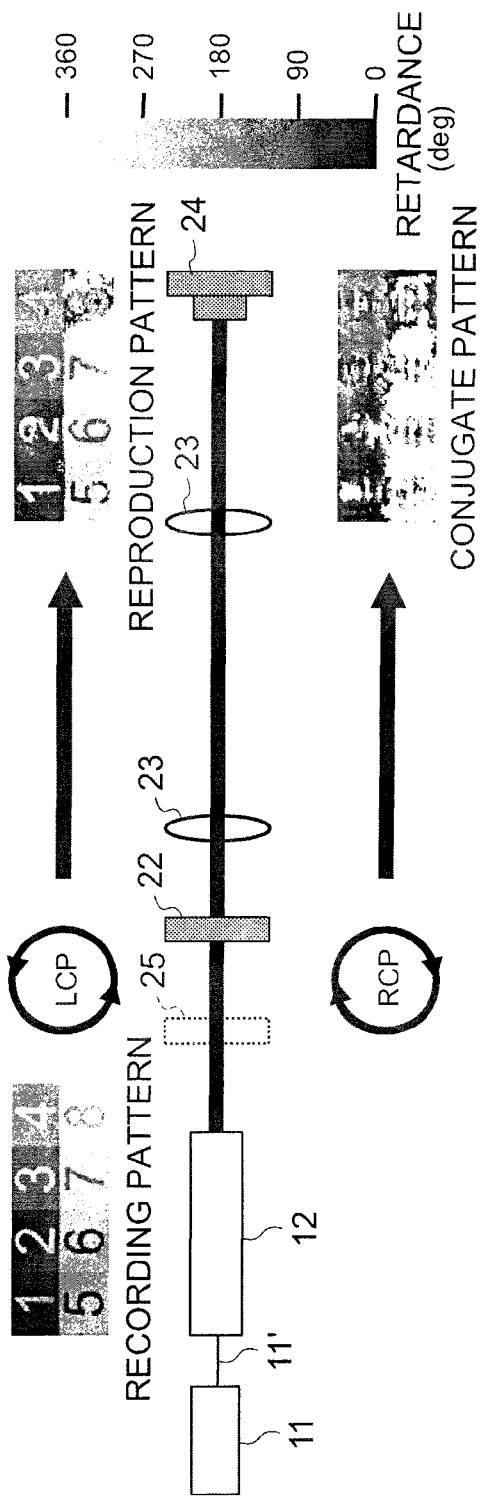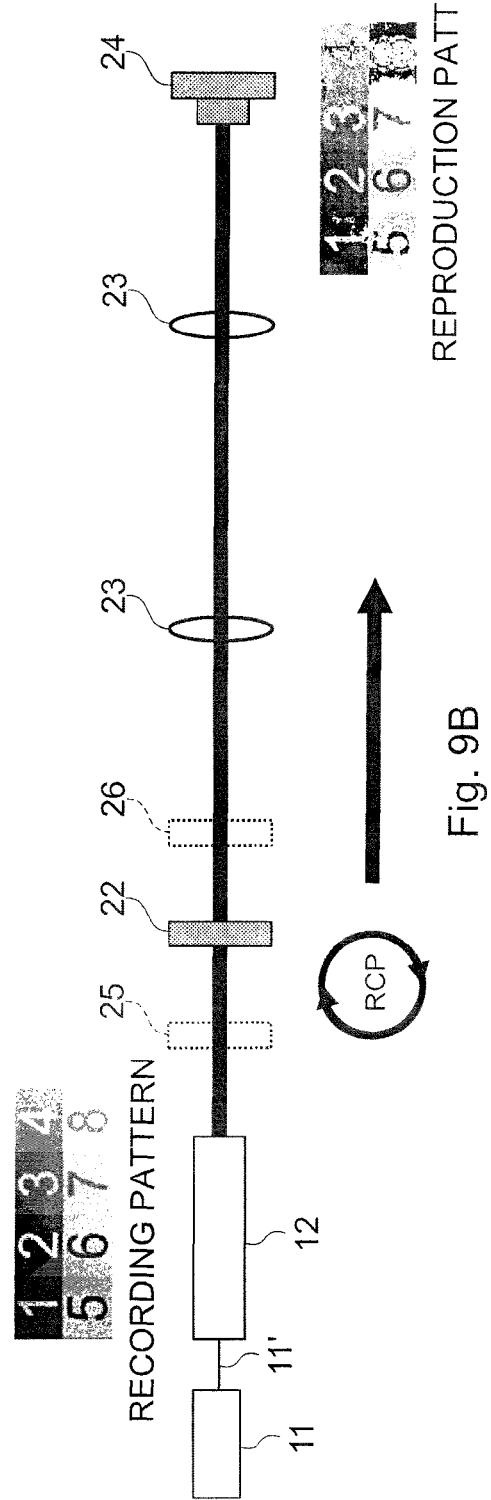
Fig. 9A
Fig. 9B

OPTICAL INFORMATION RECORDING/REPRODUCTION METHOD AND DEVICE

FIELD OF THE INVENTION

The present invention relates to optical information recording/reproduction method and device. In particular, the present invention relates to the optical information recording/reproduction method and device that have characteristics equivalent to or better than a hologram memory, and provide a small-size and large-capacity optical memory.

BACKGROUND ART

As conventional optical memories, the CD (Compact Disc), DVD (Digital Video Disc or Digital Versatile Disc), HD-DVD (High-Definition Digital Versatile Disc) and BD (Blu-Ray Disc™) are known. For these optical memories, the same method is used for recording and reproducing optical information. In response to demands for high density of recorded information and large capacity of the memories, mainly the wavelength of the used laser has been shortened, and/or a numerical aperture of a lens that focuses light on the recording medium has been increased. However, it is difficult to increase the numerical aperture of a lens more than the numerical aperture used for the BD. Moreover, if the wavelength of the laser is further shortened, absorption of the laser light in the air cannot be ignored, thereby reducing the usage efficiency of the laser light. Furthermore, there is a problem that such a device would not be practical as special peripheral optical elements would be required. Therefore, to materialize optical memories with higher density and larger capacity than the BD, new optical information recording/reproduction technologies are required.

A hologram memory is expected as an optical memory with a capacity larger than the BD. The hologram memory is an optical memory that utilizes "holographic recording (i.e., means for recording information on a recording medium by holography)," in which laser light is separated into two rays that are overlapped with each other on a recording medium after information to be recorded (recording information) is provided in one of the two rays of the laser light. More specifically, the holographic recording is a technique to record information on a recording medium by spatially separating the laser light into two rays, and by having a signal wave, which is one of the two rays of the laser light provided with information, interfere with a reference wave, which is the other ray of the laser light, in the recording medium.

This holographic recording is also expected as a terabyte-class large-capacity recording technology in recent years. In normal photographic technologies, only light intensity (brightness) can be recorded as information. However, in the holographic recording, optical phases can also be recorded as information, as well as the light intensity. In other words, there is an advantage that the hologram memory, in which information is recorded by holographic recording, can store intensity information and phase information. In addition, the hologram memory is different from the conventional optical memory, such as CD, DVD and BD, because the information is stored by effectively utilizing not only on the surface of the recording medium but also the volume of the recording medium. Therefore, there is another advantage that the hologram memory can store large-volume information. Further, in the holographic recording, the information is stored by utilizing the light intensity (amplitude) and phase. However, normally, either the intensity or the phase is used for recording the information in order to ease the handling of the recorded information.

CONVENTIONAL ART REFERENCES

Patent Document 1: Japanese Laid-Open Patent Application No. 2002-83431
Patent Document 2: WO2004/102542

DISCLOSURE OF THE INVENTION

The Problems Solved by the Invention

However, the laser light must be separated into two rays during the photographic recording as described above. Therefore, there is a shortcoming that the recording accuracy decreases due to vibrations when the vibrations are applied during the photographic recording. For such shortcoming, there is method to solve the shortcoming by spatially separating regions of signal light and reference light, and by superimposing them coaxially, as discussed in the above Patent Documents 1 and 2. However, because such method spatially separates the regions, there is a difficulty that a region that can be used for recording the information is limited. Particularly, in the holographic recording that performs the recording two-dimensionally, because area of recording light is reduced by such limitation of the region, the amount of information that is simultaneously recorded is reduced. Therefore, there is a problem that an information transfer rate for recording is reduced accordingly.

The present invention is invented to solve the above-described problems, and has an object to provide new optical information recording/reproduction method and device that provide a small-size and large-capacity optical memory has characteristics equivalent to or better than the hologram memory.

Problem Resolution Means

The optical information recording/reproduction method of the invention for solving the above-described problems comprises: an optical information recording step that records optical information in a recording medium by irradiating the recording medium with recording light which has two mutually orthogonal polarization components with phase difference between the two polarization components in an arbitrary polarization basis; and an optical information reproduction step that reproduces the optical information which is configured by one polarization component and another polarization component, another polarization being generated in the recording medium by irradiating the recording medium, in which the optical information is recorded, with the reproduction light which only has the one polarization component in an arbitrary polarization basis.

The present invention is a new optical information recording/reproduction method that uses: the recording light in the polarization state which has the two mutually orthogonal polarization components (the two polarization components including a signal light component and a reference light component) with phase difference between the two polarization components in an arbitrary polarization basis; and the reproduction light in the polarization state which only has a single polarization component (the polarization component corresponding to the reference light component of the recording light) in an arbitrary polarization basis. In other words, according to the present invention, the optical information is recorded in the recording medium, by irradiating the recording medium with the recording light in the polarization state that has the two mutually orthogonal polarization components with phase difference between the two polarization components in an arbitrary polarization basis. Further, the recorded optical information is reproduced, by irradiating the recording medium with the reproduction light in the polarization state which only has a single polarization component, which corresponds to the reference light component of the recording light, in an arbitrary polarization basis. Therefore, the optical phase information, which is recorded in the recording medium, is reproduced by the polarization analysis method. Further, because polarization modulation can be performed at the same axis, it is not necessary that the recording light and the reproduction light is divided to two beams, as in the holography. Thus, the optical system can be simplified, and effects by vibrations can be suppressed equivalent to the vibration level of the conventional optical memory. In addition, according to the optical information recording means of the present invention, because the polarization states of the signal light polarization and the reference polarization component of the two mutually orthogonal polarization components, the signal light component can be only modulated even when the two polarization components are overlapped with each other. As a result, it is not necessary that the recording regions are separated as in the holographic recording, and the high-capacity information can be recorded at once.

In the optical information recording/reproduction method of the present invention, the polarization basis used during recording of the optical information is the same as the polarization basis used during reproduction of the optical information.

In the optical information recording/reproduction method of the present invention, the polarization basis used during the recording of the optical information is different from the polarization basis used during the reproduction of the optical information, in a region other than a region in the recording medium.

In the optical information recording/reproduction method of the present invention, the polarization basis used during the recording and the reproduction of the optical information is: one of a combination of a horizontal polarization component and a vertical polarization component; a combination of two mutually orthogonal linear polarization components each of which has a predetermined polarization angle (excluding the horizontal polarization component and the vertical polarization component); a combination of a right circular polarization component and a left circular polarization component; and a combination of two mutually orthogonal elliptical polarization components each of which has a predetermined angle.

According to the present invention, one of a combination of linear polarization components, a combination of circular polarization components, and a combination of elliptical polarization components can be used, and the polarization basis can be converted based on properties of a recording device and a reproduction device.

In the optical information recording/reproduction method of the present invention, the recording medium includes a photoresponsive molecule which generates photoinduced birefringence based on respondence of a polarization state configured by the two polarization components. Specifically, when the polarization basis of the recording medium is right circular polarization and a left circular polarization, the material preferably includes push-pull azobenzene.

In the above optical information recording/reproduction method, the photoinduced birefringence of the photoresponsive molecule performs molecular orientation to a direction in which light in a predetermined polarization state is not absorbed, by performing absorption of the light in the predetermined polarization state in the photoresponsive molecule, and has a characteristic that the birefringence which has the principal axis at a polarization angle of the molecular orientation is produced.

In the optical information recording/reproduction method of the present invention, wherein phase difference between the two polarization components is in a range from $-\pi$ to $\pi$.

In the optical information recording/reproduction method of the present invention, polarization modulation of the two polarization components is performed by a spatial light modulator.

In the optical information recording/reproduction method of the present invention, a three-dimensional birefringence pattern is recorded by irradiating the recording medium with the recording light two or more times, and the optical information included in the three-dimensional birefringence pattern is reproduced by irradiating the recoding medium with the reproduction light two or more times. In this case, the optical information included in the three-dimensional birefringence pattern can be retrieved by performing reconfigure of three-dimensional configuration based on projection-slice theorem.

The optical information recording/reproduction device of the invention for solving the above-described problems comprises: a recording light generator that generates recording light in a polarization state which has two mutually orthogonal polarization components with phase difference therebetween in an arbitrary polarization basis; a reproduction light generator that generates reproduction light in a polarization state which only has a single polarization in an arbitrary polarization; a recording medium in which optical information included in the recording light is recorded and from which recorded optical information is reproduced by the reproduction light; and an optical information detector that detects the optical information by retrieving information light which is generated by irradiating the recording medium with the reproduction light.

In the optical information recording/reproduction device of the present invention, the recording light generator comprises: a recording light laser; a polarization production unit that produces the two mutually orthogonal polarization components with the phase difference therebetween in an arbitrary polarization basis; a variable phase difference providing unit that provides the two mutually orthogonal polarization components, which are produced in the polarization generator, with an arbitrary phase difference; and a polarization basis converter that converts a polarization basis of a polarization state modulated in the variable phase difference providing unit, according to a material property of the recording medium.

In the optical information recording/reproduction device of the present invention, the reproduction light generator comprises: a reproduction laser; and a polarization production unit that produces laser light in the polarization state which only has the single polarization component in the arbitrary polarization basis.

In the optical information recording/reproduction device of the present invention, the recording medium includes a photoresponsive molecule which produces photoinduced birefringence based on respondence of a polarization state formed by the two polarization components.

In the optical information recording/reproduction device of the present invention, the optical information detector detects phase information by polarization interference, as intensity information, the phase information being included in the reproduction light which is transmitted from the recording medium.

In the optical information recording/reproduction device of the present invention, t the optical information detector retrieves phase information from several intensity information, the several intensity information being obtained by a phase shift method and polarization interference, based on a signal light component and a reference light component included in the information light which is transmitted from the recording medium.

In the optical information recording/reproduction device of the present invention, the optical information detector retrieves phase information from several intensity information, the several intensity information being obtained by a phase shift method and polarization interference, based on a signal light component and a reference light component included in the information light which is transmitted from the recording medium, and the optical information detector comprises; a polarization basis convertor that converts a polarization basis of the information light which is transmitted from the recording medium; a variable phase retarder that provides two polarization components in the information light, which is transmitted though the polarization basis convertor, with a predetermined phase difference; a polarization interference unit that overlaps complex amplitude of the two polarization components in the information light which is transmitted though the variable phase retarder, as a predetermined ratio; and a detector that detects intensity of the information light which is transmitted though the polarization interference unit.

In the optical information recording/reproduction device of the present invention, the optical information detector retrieves phase information from several intensity information, the several intensity information being obtained by a phase shift method and polarization interference, based on a signal light component and a reference light component included in the information light which is transmitted from the recording medium, and the recording medium has a three-dimensional birefringence pattern by transmitting the recording light two or more times, and the phase information included in a recorded three-dimensional birefringence pattern is reproduced by transmitting the reproduction light to the recording medium two or more times.

In the optical information recording/reproduction device of the present invention, the phase information included in a recorded three-dimensional birefringence pattern is retrieved by performing reconfigure of three-dimensional configuration based on projection-slice theorem.

Efficacy of the Invention

According to the optical information recording/reproduction method and device of the present invention, optical phase information that is recorded in the recording medium can be reproduced by a polarization analysis method. Further, the polarization modulation can be performed coaxially, and it is not necessary to separate the laser light into two rays as in the holography. Therefore, the optical system can be simplified, and effects by vibrations can be suppressed to a level for the conventional optical memory. Further, because polarization states of the signal light component and the reference light component, which are the two mutually orthogonal polarization components, only the signal light component can be modulated even if the signal light component and the reference light component are overlapped with each other. As a result, it is not necessary to separate the recording regions as in the holographic recording, thereby allowing a large amount of information to be recorded at once.

Further, according to the optical light recording/reproduction method and device of the present invention, because the two polarization components function as the signal light component (a signal wave) and the reference light component (a reference wave) of the holography, the information can be provided as polarization modulation. As a result, recording characteristics that are equivalent or better than the holographic recording can be achieved with a single light wave.

Moreover, as described above, a small device that endures the vibration can be configured. Therefore, it appears promising as a new optical memory that is small in size and has a large capacity. Further, like the holography being utilized as an optical measurement technology, the optical information recording/reproduction method and device of the present invention that do not separate the signal light and the reference light can also be utilized for precise optical measurement technology because it is not affected by vibrations.

The optical information recording/reproduction method and device of the present invention can be preferably used as an optical memory for the purpose of data backup, data recording for carrying and an optical information processing device.

BRIEF DESCRIPTIONS OF FIGURES

FIGS. 1(A)-(E) are schematic diagrams showing a polarization state.

FIGS. 2(A)-(D) are schematic configuration diagrams showing one example of a device that performs an optical information recording method included in the optical information recording/reproduction of the present invention.

FIGS. 3(A)-(E) are schematic configuration diagrams showing one example of a device that performs an optical information reproduction method included in the optical information recording/reproduction of the present invention.

FIGS. 4A-C are schematic configuration diagrams showing one example of a device that performs a retrieving method of the phase information from the recording medium in an optical information recording method included in the optical information recording/reproduction of the present invention.

FIGS. 9(A) and 9(B) are schematic configuration diagrams showing examples of a reproduction of retardergram.

Figure 10:
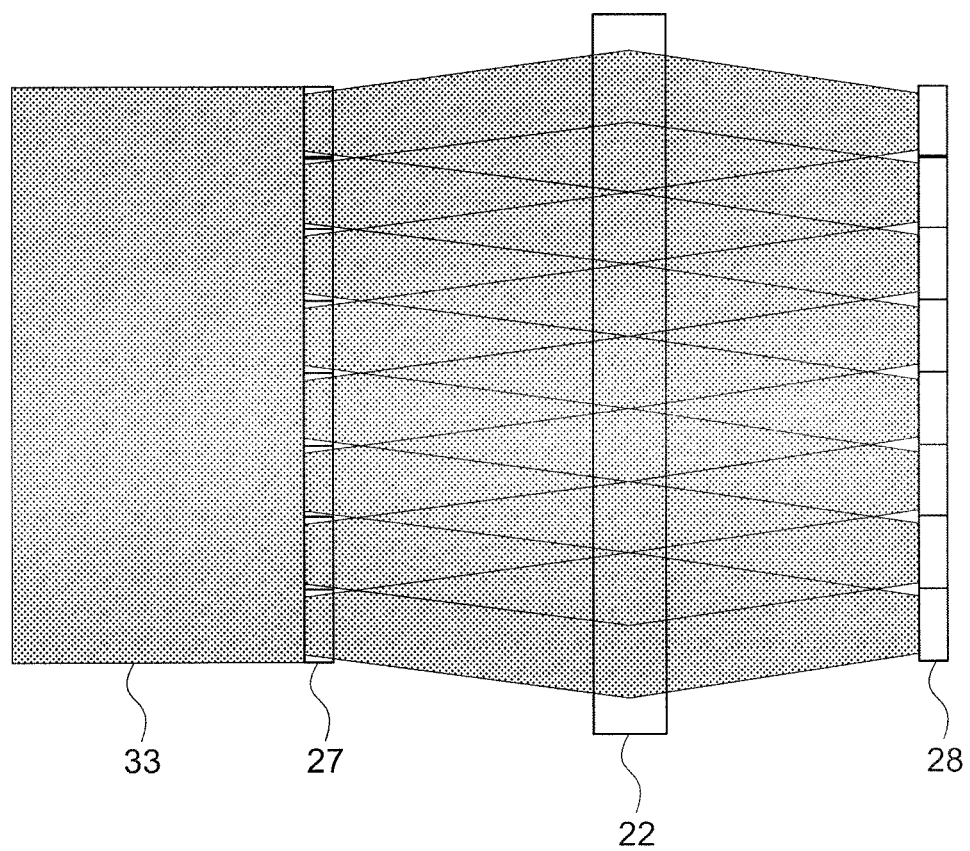

FIG. 10 is a schematic configuration diagram showing one example of a recording/reproduction device which performs the reproduction of a conjugate wave.

Figure 11:
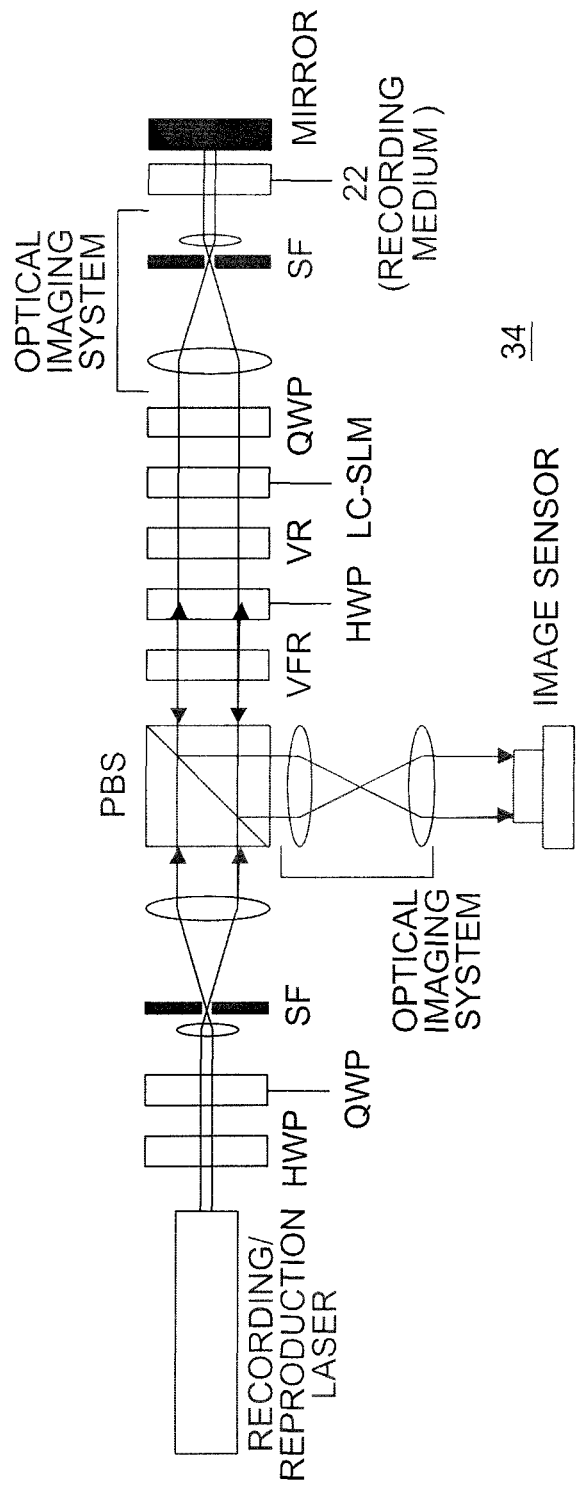

FIG. 11 is a schematic configuration diagram showing one example of a reflection type recording/reproduction device which has an optical information detector at a light source side in view of the recording medium.

Figure 12:
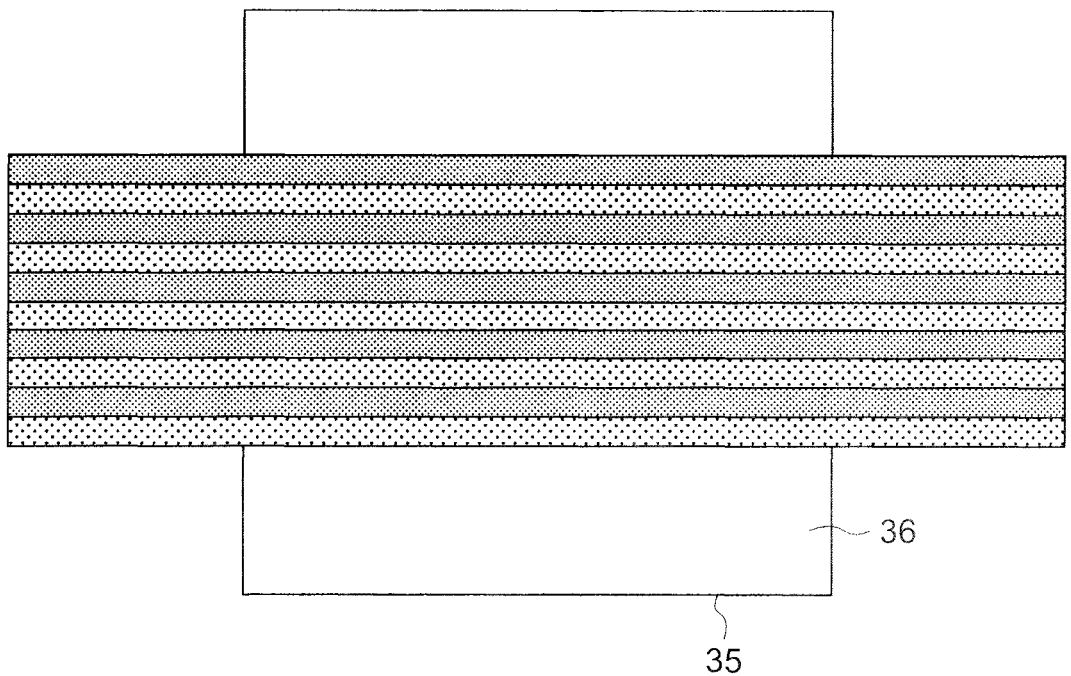

FIG. 12 is a schematic diagram to describe the volume recording.

Figure 13:
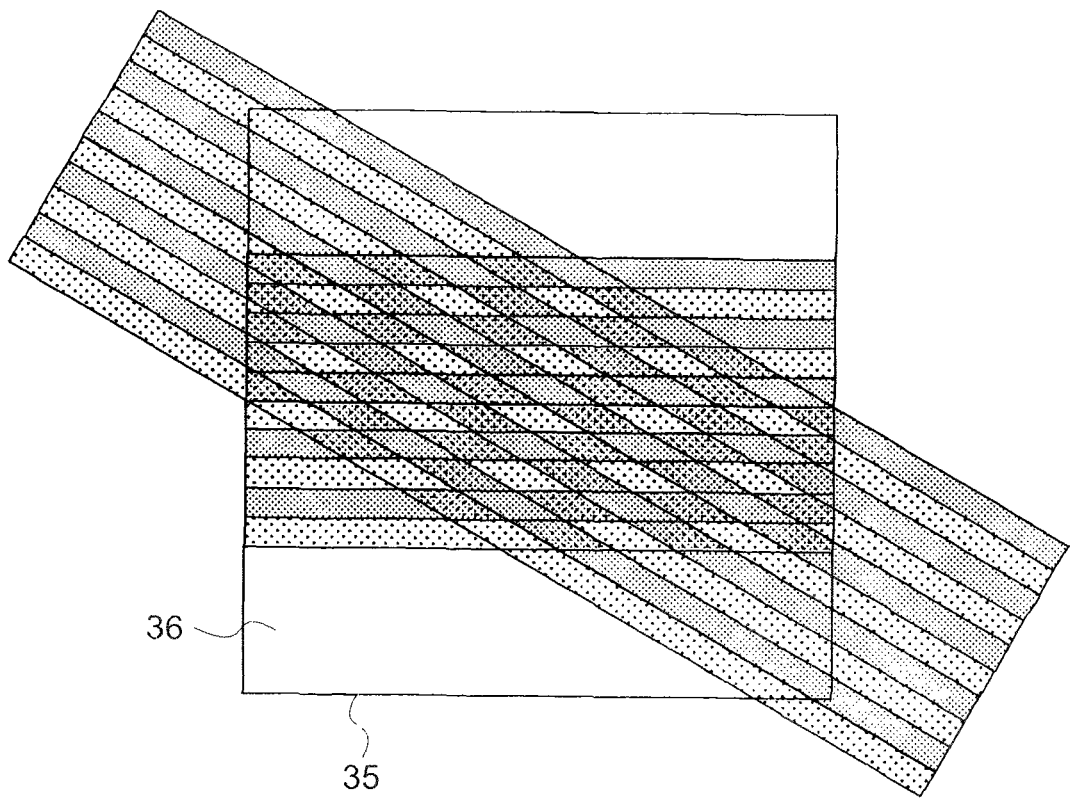

FIG. 13 is anther schematic diagram to describe the volume recording.

BEST EMBODIMENT OF THE INVENTION

Next, preferred embodiments of the present invention are described based on the drawings. The present invention includes a scope of its technical characteristics and is not limited by the below-described drawings and the like.

[Optical Information Recording/Reproduction Method and Device]

The optical information recording/reproduction method of the present invention includes: an optical information recording step that records optical information on a recording medium by illuminating, to the recording medium, recording light that is in a polarization state in which two mutually orthogonal polarization components with a phase difference at an arbitrary polarization basis; and an optical information reproduction step that illuminates reproduction light in a polarization state with a single polarization component at an arbitrary polarization basis, to the recording medium in which the optical information is recorded, and that reproduces the optical information based on the single polarization component and another polarization component generated in the recording medium after the illumination.

In addition, the optical information recording/reproduction device includes: a recording light generation unit that generates recording light in a polarization state in which two mutually orthogonal polarization components with a phase difference at an arbitrary polarization basis; a reproduction light generation unit that generates reproduction light in a polarization state with a single polarization component at an arbitrary polarization basis; a recording medium in which optical information is recorded by the generated recording light and from which the recorded optical information is reproduced by the generated reproduction light; and an optical information detection device that detects the optical information by extracting information light generated based on the illumination of the reproduction light to the recording medium.

As discussed above, the optical information recording/reproduction method and device are new method and device that use the recording light in the polarization state in which two mutually orthogonal polarization components (two polarization components configured by a signal light component and a reference light component) with the phase different at the arbitrary polarization basis as phase different information, and the reproduction light in the polarization state with the single polarization component (the polarization component that corresponds to the reference light component of the recording light) at the arbitrary polarization basis.

First, a concept of the optical information recording/reproduction method and device (hereafter referred to as "optical information recording/reproduction method" unless otherwise specifically stated) of the invention is described in detailed.

The optical information recording/reproduction method proposed in the present invention is invented based on the below-described concept. However, the invention may be separately categorized into an optical information recording method, an optical information reproduction method and an optical information recording/reproduction method that includes both of the methods according to the present invention. The optical information recording/reproduction method of the present invention has a characteristic that processes relative phase information by using a polarization component that is a basis of the phase as a reference light component, and another polarization component that has a relative phase based on the reference light component as a signal light component, among the mutually orthogonal polarization components of recording light and reproduction light with a phase difference at an arbitrary polarization basis.

Figure 1A:
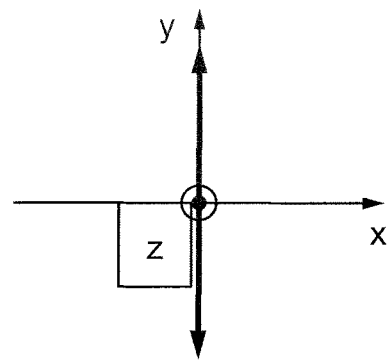
Figure 1B:
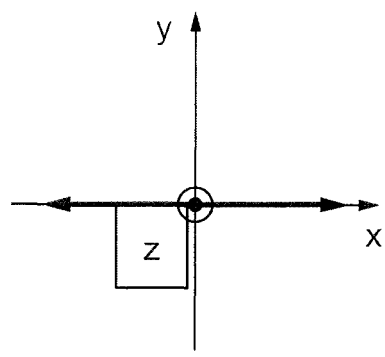
Figure 1C:
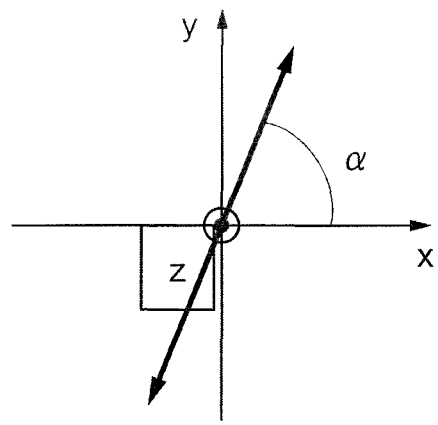
Figure 1D:
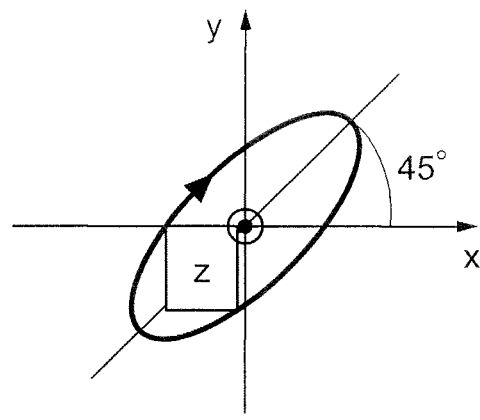

FIGS. 1(A)-(E) are schematic diagrams showing a polarization state. Light is a type of an electromagnetic wave, and a wave by vibrations of electric field and magnetic field. The light that has a specific vibration state is called "polarization." With a direction of the vibration of the electric field as a reference, the polarization is normally referred to as "linear polarization" for a polarization state in which the vibration occurs along a vector of the electric field, for example. The polarization is referred to as "circular polarization" for a polarization state in which the direction of the vibration of electric field is not fixed and in which the vibration plots a circular vector according to time change. FIG. 1(A) shows vertical polarization in which the vibration occurs along the y axis. FIG. 1(B) shows horizontal polarization in which the vibration occurs along the x axis. As shown in FIG. 1(C), the polarization when the vibration occurs at a predetermine polarization angle α between the x and y axes is also the linear polarization. The polarization in a normal polarization state is "elliptical polarization" that plots an ellipsoidal vector, as shown in FIG. 1(D). It can be said that the linear polarization and the circular polarization are specific states including the elliptical polarization. FIG. 1(D) shows elliptical polarization at the polarization angle of 45 degrees. The symbol a represents an angle of the linear polarization in the recording medium.

Figure 1E:
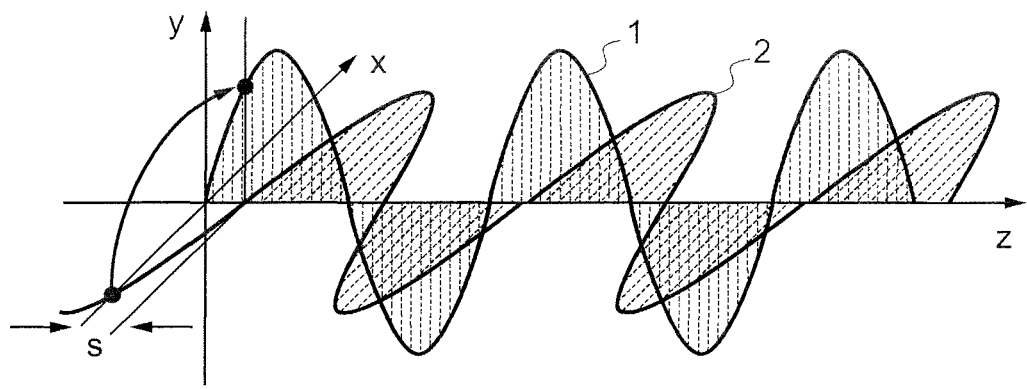

FIG. 1(E) shows a certain polarization state by superposing two mutually orthogonal polarization states. The two mutually orthogonal polarization states mean a combination of two polarization states of which an inner product becomes zero when polarization is expressed by vectors that are represented by complex numbers. In this example, the certain polarization state is represented by an intensity ratio and a phase difference of the two mutually orthogonal polarization components. More specifically, the certain polarization state has predetermined intensity ratio and the phase difference (called polarization phase difference S) of perpendicularly polarization component P1 and horizontally polarization component P2 that are mutually orthogonal. In other words, perpendicularly polarization component P1 has vibration of the electric field in the perpendicular direction (on the y axis). Horizontally polarization component P2 has vibration of the electric field in the horizontal direction (on the x axis). As shown in FIG. 1(E), they are mutually orthogonal with polarization phase difference S. In contrast, the circular polarization can be represented by a sum of orthogonal linear polarizations and is a polarization state in which their amplitude ratios are the same and the phase differences are 90 degrees. In addition, the rotational direction of the circular polarization is based on a sign of the phase differences. In contrary, the linear polarization can be represented by a sum of right circular polarization and left circular polarization. Further, elliptical polarization can be represented by two mutually orthogonal polarization states. In this case, because there are an infinity of shapes of ellipsoidal vectors, the elliptical polarization can be represented by selecting two certain polarization states. For example, the elliptical polarization at the polarization angle of 45 degrees in FIG. 1(D) can be represented by a combination of vertical polarization component and horizontal polarization component when the component ratio therebetween is 1 and the phase difference therebetween is degrees other than 0 degrees and 90 degrees.

The present invention uses light of polarization state, which has two mutually orthogonal polarization components (two polarization components configured by a signal light component and a reference light component) with a phase difference at an arbitrary polarization basis, as recording light. Further, the present invention uses light of polarization state, which has a single polarization component (polarization component corresponding to the reference light component of the recording light) at the arbitrary polarization basis, as reproduction light. In particular, the optical information recording method in the present invention includes recording phase difference (polarization phase difference) between the signal light component and the reference light component that are two polarization components of the recording light. Further, the optical information reproduction method in the present invention includes: irradiating a recording medium with the reproduction light that only has the reference light component; performing polarization analysis of the polarization state that is formed by transmitted reference light component though and the signal light component generated at the recording medium; and retrieving the phase information from the recording medium and reproducing the retrieved phase information.

A polarization basis has to be selected so that the same polarization basis in the recording medium is used during recording and reproduction of the phase information. However, polarization bases of a region (part) other than a region (part) in the recording medium are the same or different from each other. Because the polarization basis in the recording medium can be different from that in the region other than the region in the recording medium, there is an advantage that each of the polarization bases in every element of a device can be adjusted to the best polarization basis. Types of combinations of the polarization bases include a combination of linear polarizations, a combination of circular polarizations, and a combination of elliptical polarizations. Specifically, types of combinations of the polarization bases include a combination of horizontal polarization and vertical polarization, a combination of two linear polarizations that have an arbitrary polarization angle (except for the horizontal polarization and the vertical polarization), a combination of right circular polarization and left circular polarization, and a combination of two elliptical polarization that have an arbitrary polarization angle.

(Optical Information Recording Method)

FIGS. 2(A) and (B) are schematic configuration diagrams showing one example of a device that performs an optical information recording method included in the optical information recording/reproduction method of the present invention. As shown in FIG. 2(A), the optical information recording method of the present invention (including an optical information recording device unless otherwise specifically stated) is performed by a device. The device has: recording-light laser 1; polarization modulator 2 that modulates laser light 1' output from recording-light laser 1 to a polarization state, which has two mutually orthogonal polarization components at the arbitrary polarization basis (for example, horizontal polarization component and perpendicular vertical component), and that provides a phase difference, which is recording information, between the horizontal polarization component and the vertical polarization component; quarter-wave plate 3 that converts the horizontal polarization component and the vertical polarization component in modulated light 2' polarized in polarization modulator 2 to polarization bases of right circular polarization and left circular polarization, respectively; and recording medium 4 in which recording phase information is recorded by recording light 3', the recording phase information being represented by the phase difference between two mutually orthogonal polarization components which are the right circular polarization component and the left circular polarization component, recording light 3' having polarization bases which are converted by quarter-wave plate 3 and which are represented by a combination of the right circular polarization component and the left circular polarization component. In this case, polarization modulator 2 includes a polarization generator and a variable phase-difference providing devise.

In a optical system shown in FIG. 2(A), a horizontal polarization component is defined as a signal light component, a vertical polarization component is defined as a reference light component, and a relative phase of the signal light component based on the reference light component is defined as phase information. Hereinafter, these structures are described in order. Incidentally, coordinate axes of FIG. 2(B) correspond to coordinate axes of the optical system shown in FIG. 2(A). An axis from the left side to the right side on the drawing of FIG. 2(B) is a z-axis. FIG. 2(C) is an example of a polarization state of modulated light 2' that includes the phase information in a polarization state which has two mutually orthogonal polarization components, and that are generated in polarization modulator 2 in a polarization basis which has the horizontal polarization component and the vertical polarization component. FIG. 2(D) is an example of a polarization state of recording light 3' that is generated by changing the polarization basis, which has the horizontal polarization component and the vertical polarization component, to a polarization basis, which has right circular polarization component and left circular polarization component, in quarter-wave plate 3.

Recording-light laser 1 outputs light that has a wavelength to which a material in recording medium 4 reacts. For example, a semiconductor laser is used as recording-light laser 1. For example, when recording medium 4, which includes azobenzene as described below, is used, recording-light laser 1 can be preferably configured by a laser that outputs light having the wave length of 400 nm-550 nm within a wavelength range in which azobenzene reacts, such as a semiconductor laser and a solid-state laser. Specifically, recording-light laser 1 can be configured by a laser diode that output light having the wave length of 400 nm-410 nm. Also, recording-light laser 1 can be configured by an argon laser that is larger in size than others and that outputs light having the wavelength of 488 nm, 514 nm.

A photocrosslinkable polymer liquid crystal material can be used as a reactive material in the recording medium other than azobenzene. Because the photocrosslinkable polymer liquid crystal material has a characteristic that molecular orientation thereof fixes after reacting to the laser light, the photocrosslinkable polymer liquid crystal material can be preferably used as a material on a write-once recordable medium.

Polarization modulator 2 modulates laser light 1' output from recording-light laser 1 to modulated light 2' in a predetermined polarization state. For example, when the component ratio of the two polarization components (the horizontal polarization component and the vertical polarization component) is 1 to 1 and the phase difference between the two polarization components is provided, laser light 1' is modulated to modulated light 2' that is elliptical polarization at an angle of 45 degrees or −45 degrees based on the phase difference. Further, according to the phase difference between the two polarization components, modulated light 2' may be linear polarization at an angle of 45 degrees or −45 degrees, the left circular polarization component or the right circular polarization component. The phase difference of modulated light 2' can be used as the phase information. The phase information of modulated light 2' is equally provided by a phase modulator. Also, the phase information of modulated light 2' is provided by a phase spatial light modulator as two dimensional page-data.

The polarization modulator 2 can be configured by a liquid crystal variable phase retarder, a magneto-optical element, a half-wave plate, a quarter-wave plate and so on. However, polarization modulator 2 is not necessarily configured by the above-described components. The liquid crystal variable phase retarder can provide the phase information between the two mutually orthogonal linear polarization components. Further, the magneto-optical element can provide the phase difference between the right and left circular polarization components. Further, when modulated light 2' equally modulates the polarization state of laser light 1', the phase information is recorded every spot in recoding medium 4, as a conventional optical disc. Then, an optical path of the recording light 3' in recording medium 4 is overlapped with other optical path in a part of a region in recording medium 4.

Quarter-wave plate (first axis of 45 degrees) 3 converts modulated light 2' which is modulated in polarization modulator 2 to recording light 3' that has a superimposed state having a combination of the right circular polarization and the left circular polarization. The combination of the right circular polarization and the left circular polarization that has an intensity ratio of 1:1 is recording light 3' that is linear polarization (for example, the linear polarization at the angle α in FIG. 2D) at an angle corresponding to the phase difference therebetween. Then, the angle α of recording light 3' that is the linear polarization depends on the phase information of modulated light 2'. The phase information is recorded in recording medium 4 by recording light 3' that is the linear polarization or distribution of the linear polarization at the angle corresponding to the phase information. For example, azobenzene provided in recording medium 4 has a function to hold information by photo-orientation that is performed based on irradiation of recording light 3, because the photo-orientation is performed to a polarized angle corresponding to the phase information, as described below.

The relationship between the phase information and the polarization angle are described hereinafter, by numerical formulas. The following Formula 1 represents the Jones vector of elliptical polarization (modulated light 2' modulated by polarization modulator 2) at the angle of 45 degrees. In formula 1, $\Phi$ represents the phase information, and $\Phi_0$ represents a constant of a phase provided by a characteristic of a device.

$$\frac{\sqrt{2}}{2}\begin{bmatrix} \exp[i(\Phi+\Phi_0)] \\ 1 \end{bmatrix} \quad \text{[Formula 1]}$$

When performing matrix operation of formula 1 and the Jones matrix of quarter-wave plate 3 that has the first axis of 45 degrees, recording light 3' which is transmitted though quarter-wave plate 3 is converted to the Jones vector of linear polarization at the angle α, as represented by following formula 2. $R(\theta)$ is a rotation matrix (rotational polarization angle θ and is represented by formula 3.

$$\exp\left(i\frac{\Phi+\Phi_0}{2}\right)R(-\alpha)\begin{bmatrix} 1 \\ 0 \end{bmatrix} \quad \text{[Formula 2]}$$

$$R(\theta) = \begin{bmatrix} \cos\theta & \sin\theta \\ -\sin\theta & \cos\theta \end{bmatrix} \quad \text{[Formula 3]}$$

The linear relationship between the angle α and the phase information $\Phi$ is represented by following formula 4.

$$\alpha = \frac{\pi}{4} - \frac{\Phi+\Phi_0}{2} \quad \text{[Formula 4]}$$

Because birefringence, which has the principal axis corresponding to the polarization angle of recording light 3', is induced in recording medium 4 irradiated by the polarization, the Jones matrix M is represented by formula 5. In formula 5, $\Delta\phi$ represents a phase delay amount of the induced birefringence (a physical property value depending on a light amount), and $R(\alpha)$ represents the rotation matrix at the angle α.

$$M = R(-\alpha)\begin{bmatrix} 1 & 0 \\ 0 & \exp(-i\Delta\phi) \end{bmatrix}R(\alpha) \quad \text{[Formula 5]}$$

As shown in formula 5, the phase information $\Phi$ of recording light 3' is only included in the rotor $R(\alpha)$. The phase information $\Phi$ is recorded in recording medium 4, as a principal axis of birefringence M. Further, a phase delay amount $\Delta\phi$ based on the induced birefringence in recording medium 4 is the physical property value of recording medium 4 depending on the light amount of recording light 3', and does not include the phase information which is a target recorded in recording medium 4.

(Optical Information Reproduction Method)

Next, the optical information reproduction method is described. FIGS. 3(A)-(E) are schematic configuration diagrams showing one example of a device that performs an optical information reproduction method included in the optical information recording/reproduction of the present invention. As shown in FIG. 3(A), the optical information reproduction method of the present invention (including an optical information reproduction device unless otherwise specifically stated) is performed by a device. The device has: reproduction light laser 11; polarization modulator 12 that modulates laser light 11' output from reproduction light laser 11, to polarization state (vertical polarization) that only has a single polarization component at an arbitrary polarization basis (for example, a horizontal polarization component and a vertical polarization component); quarter-wave plate 13 that converts modulated light 12' polarized in polarization modulator 12, to left circular polarization; and recording medium 4 irradiated by reproduction light of the left circular polarization that is converted in quarter-wave plate 13 and has the same polarization state as the reference light component of the recording light. In this optical system, in the same way as on the optical information recording method, in a polarization basis provided in the initial state and a polarization basis used when information is retrieved, a horizontal polarization component is defined as a signal light component, a vertical polarization component is defined as a reference light component, and a relative phase of the signal light component based on the reference light component is defined as the phase information. Hereinafter, these structures are described in order.

FIG. 3(B) is an example of a polarization state (the vertical polarization) of modulated light 12' polarized in polarization modulator 12. FIG. 3(C) is an example of a polarization state (the left circular polarization) of reproduction light 13' that is converted based on a combination of the right circular polarization component and the left circular polarization component, from a combination of the horizontal polarization component and the vertical polarization component in quarter-wave plate 13. FIG. 3(D) is an example of a polarization state (elliptical polarization configured by the horizontal polarization component and the vertical polarization component in a different component ratio) of information light 14' after irradiating recording medium 14 with reproduction light 13'. FIG. 3(E) is an example of a polarization state (the elliptical polarization configured by the horizontal polarization component and the vertical polarization component in a different component ratio) of information light 14' that has the phase difference provided in quarter-wave plate 15.

In the optical information reproduction method, information recorded by point recording and two dimensional planar recording can be reproduced by point reproduction and two dimensional planar reproduction, respectively. Information recorded by the point recording can be reproduced by the two dimensional planar reproduction. Information recorded by the two dimensional planar recording can be reproduced by the point reproduction. Such point recording or planar recording is performed by specific means such as a uniform variable phase retarder provides optical information to one point on a recording medium, or a phase spatial light modulator two-dimensionally provides optical information. Further, as a detector in an optical information detector, the point recording or the planar recording is performed by specific means including a pinhole and a photodiode device that detects light intensity at one point on a recording medium, or an image sensor that detects two-dimensionally light intensity such as a CCD and a CMOS.

Essentially, a conventional hologram memory performs the planar (two-dimensional) recording and the planar (two-dimensional) reproduction. Further, the conventional hologram memory has the characteristic that an information amount, which is recorded simultaneously, is large. However, now there is no device (spatial light modulator), which provides two-dimensional information, and image sensor for the hologram memory that have enough operation speed corresponding to memory size. For example, even if a hologram memory that can record information by record density ten times as high as the BD, the information cannot be recorded in the hologram memory and reproduced from the hologram memory. Further, even if the hologram is manufactured, there may be a problem that the hologram memory is expensive and a production cost of the hologram memory is high. In contrast, the optical information recording/reproduction method of the present invention can record the high-capacity information by the point recording, as well as the planar recording. Further, the optical information recording/reproduction method has a characteristic that point-recorded information is reproduced by the planar reproduction, and planar-recorded information is reproduced by the point reproduction. Therefore, there is an advantage that the point recording or the planar recording and the point reproduction or the planar reproduction can be flexibly selected according to development of peripheral equipments.

Reproduction light laser 11 output one of laser light which has a wavelength insensitive to a material in recording medium 14 (specifically, to which the material does not react), or laser light of which intensity is lowered so that photo-orientation does not occur and which has the same wavelength as the one used during recording of the phase information. For example, when recording medium 14, which includes azobenzene as described below, is used, reproduction light laser 11 can be preferably configured by an He—Ne laser having a wavelength of 632.8 nm, a red laser diode having a wavelength of more than 600 nm or the like, which are within a wavelength range that azobenzene does not react. When a material (such as photocrosslinkable polymer liquid crystal material), which has a characteristic that the photo-orientation is fixed during recording of the phase information, is used, laser light, which has the same wavelength as the one used during recording the phase information, can be used during reproduction of the phase information and then there is no limit of intensity of reproduction laser light. Additionally, in the case where the laser light, which has the same wavelength as the one used during recording of the phase information, is used, a device which performs the optical information reproduction method can be manufactured smaller than a device which uses the other wavelength.

Polarization modulator 12 modulates laser light 11' output from reproduction light laser 11 to modulated light 12' in a predetermined polarization state that only has a single polarization component at an arbitrary polarization basis. For example, as shown in FIG. 3B, laser light 11' is modulated to modulated light 12' in the same polarization state as the linear polarization (the reference light component that is the vertical polarization component in FIG. 2C, for example) that does not have information among the two linear polarization components of recording light 3' described in FIG. 2C. Such modulated light 12' having the linear polarization component is transmitted though the quarter-wave plate 14 that has the first axis of 45 degrees as similarly used during recording of the phase information. In this way, modulated light 12' is configured by the linear polarization component is converted to the circular polarization (the left circular polarization) as shown in FIG. 3C, and then recording medium 14 is irradiated with reproduction light 13' that is configured by the circular polarization.

Reproduction light 13' that is converted to information light 14' by irradiating recording medium 14. A polarization state of information light 14' is converted to the elliptical polarization from the circular polarization (the left circular polarization) by appearing birefringence based on the photo-orientation of photosensitive materials (for example, azobenzene as described below) in recording medium 14 during recording of the phase information, as shown in FIG. 3D. When the elliptical polarization is represented by a combination of right circular polarization 14a and left circular polarization 14b as shown in FIG. 3D, it is assumed that the right circular polarization 14a is generated by appearing birefringence based on the photo-orientation of the photosensitive materials. In this case, the left circular polarization component of reproduction light 13' transmitted to recording medium 14 and information light 14' configured by the generated right circular polarization component has the recorded phase information.

For example, when "0 degrees" phase information (polarization basis of the circular polarization) is recorded by the optical system, the fast axis of birefringence induced in recording medium 14 is "0 degrees." Further, when the phase delay amount Δϕ based on the birefringence at this time is "90 degrees," reproduction light 13' that is the left circular polarization transmitted recording medium 14 is converted to the linear polarization of −45 degrees. When the linear polarization of −45 degrees is represented by the right circular polarization component and the left circular polarization component, the phase difference between the right circular polarization component and the left circular polarization component is 90 degrees. On the other hand, when "45 degrees" phase information (the polarization basis of the circular polarization) is recorded by the optical system, the phase difference between the right circular polarization component and the left circular polarization component after transmitting though recording medium 14 is 135 degrees. The phase difference between the right circular polarization component and the left circular polarization component after reproduction light 13' is transmitted though recording medium 14 is calculated by only adding 90 degrees to recording phase information. Therefore, the recording phase information can be reproduced accurately. When the phase delay amount Δϕ is a degree other than 90 degrees, the component ratio of the two circular polarization components is not "1" and reproduction light 13' is the elliptical polarization after reproduction light 13' is transmitted though recording medium 14. In this case, it is necessary that the phase information in the recording medium 14 meets the above role.

When information light 14' is transmitted though quarter-wave plate 15 that has the first axis of −45 degrees as shown in FIG. 3D, a conversion of polarization basis is performed regarding a combination of right circular polarization 14a and left circular polarization 14b as shown in FIG. 3D. Consequently, the combination of right circular polarization 14a and left circular polarization 14b is converted to a combination of horizontal polarization 15a and vertical polarization 15b as shown in FIG. 3E. As a result, the orthogonal linear polarization component that has phase information.

Specifically, as shown in FIG. 3C, when reproduction light 13' modulated to the left circular polarization is transmitted in recording medium 14 in which birefringence is induced, because the polarization state of reproduction light 13' is converted, reproduction light 13' is converted to information light 14' that is the elliptical polarization. The elliptical polarization state, as shown in FIG. 3D, can be represented by the sum of the right and left circular polarization components 14a, 14b which have different amplitude from each other. Therefore, a polarization modulation from left circular polarization in FIG. 3C to elliptical polarization in FIG. 3D can be represented by additional generation of right circular polarization component 14a. Thus, when left circular polarization component 14b is converted to original vertical polarization component 15b in quarter-wave plate 15 that has the first axis of −45 degrees, right circular polarization component 14a is converted to horizontal polarization component 15a. Horizontal polarization component 15a is reproduction signal including the recorded information. It is easy to retrieve the recorded information when a signal light component and a reference light component finally have a polarization basis of linear polarization. Also, the recorded information can be retrieved even when circular polarization is not converted to the linear polarization and polarization basis of circular polarization is finally maintained, because the phase information is reproduced by polarization analysis.

Such reproduction method is described by formulas. The formula 6 represents the Jones vector of vertical polarization that is produced by modulating laser light 11' in polarization modulator 12.

$$\begin{bmatrix} 0 \\ 1 \end{bmatrix}$$ [Formula 6]

When modulated light 12' that is configured by vertical polarization is transmitted though quarter-wave plate 13 that has the first axis of 45 degrees, reproduction light 13' that is transmitted though quarter-wave plate 13 is represented the Jones vector of the left circular polarization as represented by formula 7.

$$\frac{\sqrt{2}}{2}\exp\left(i\frac{\pi}{4}\right)\begin{bmatrix} 1 \\ -i \end{bmatrix}$$ [Formula 7]

When performing matrix operation of the Jones matrix of the recording medium that is calculated by formula 5 by irradiating recording medium 14 with reproduction light 13', the Jones vector of left circular polarization represented by formula 7 is modified as represented by formula 8. Consequently, when information light 14' that is transmitted in recording medium 14 is transmitted though quarter-wave plate 15 which has the first axis of −45 degrees, the Jones vector of the left circular polarization represented by formula 7 is finally modified as represented by formula 9.

$$\frac{\sqrt{2}\exp(i\pi/4-i\alpha)}{2}R\left(-\frac{\pi}{4}+\frac{\Phi+\Phi_0}{2}\right)\begin{bmatrix} 1 \\ -i\exp(-i\Delta\phi) \end{bmatrix}$$ [Formula 8]

$$\sin\left(\frac{\Delta\phi}{2}\right)\exp\left(-i\frac{\Delta\phi}{2}\right)\begin{bmatrix} \exp[i(\Phi+\Phi_0)] \\ -i\cot(\Delta\phi/2) \end{bmatrix}$$ [Formula 9]

The angle of elliptical polarization that is represented by the rotation matrix of formula 8 includes the phase information, and then horizontal polarization component can only includes the phase information by modifying formula 8 to formula 9. The phase of the vertical polarization component in formula 9 does not include any information, and the horizontal polarization component (exp(i(Φ+Φ0)), on the other hand, represents the reproduction signal. Additionally, in formula 9, a coefficient (sin(Δϕ/2)exp(−iϕ/2))) is a coefficient depending on a value of birefringence, and does not have the phase information (hereinafter, A).

(Retrieving Method of Reproduction Signal)

Next, a retrieving method of the reproduction signal from the recording medium is described. FIGS. 4A-C are schematic configuration diagrams showing one example of a device that performs a retrieving method of the phase information from the recording medium in an optical information recording method included in the optical information recording/reproduction of the present invention.

Reproduction signal 15' that is produced by transmitting reproduction light 13' though recording medium 14 and subsequently transmitting information light 14', which is output from recording medium 14, though quarter-wave plate 15 have the two polarization sates that is configured by signal light component Jsig which is horizontal polarization component 15a and reference light component Jref which is vertical polarization component 15b. When reproduction signal 15' is transmitted though phase retarder 16 and polarizer 17, vertical polarization component 15b is produced by cutting other components of reproduction signal 15' at polarizer 17. However, the phase information cannot be directly retrieved based on vertical polarization component 15b. Therefore, in the present invention, vertical polarization component 15b is used as a reference signal, and the phase information is retrieved by a phase shift method. Additionally, instead of polarizer 17, a polarization beam splitter can be used.

$$\begin{bmatrix} J_{sig} \\ J_{ref} \end{bmatrix} = A \begin{bmatrix} \exp[i(\Phi + \Phi_0)] \\ -i\cot(\Delta\phi/2) \end{bmatrix} \quad \text{[Formula 10]}$$

The phase shift method is a method for retrieving complex amplitude information from only a signal wave based on several intensity distributions that are produced by providing several reference waves with several phase shifts, and making the reference waves each interferes with the signal wave. In the present invention, as shown in FIG. 4, vertical polarization component 15b which is the reference wave is provided with the phase shift by transmitting vertical polarization component 15b though phase retarder 16. However, signal light component Jsig and reference light component Jref do not interfere with each other in reproduction signal 15' transmitted through phase retarder 16. Therefore, the intensity of information light 17' is detected by interfering with signal light component Jsig and reference light component Jref at polarizer 17. Further, polarizer 17 can retrieve one of the signal light component and the reference light component by adjusting a polarization angle of the polarizer 17. However, in the phase shift method, because it is necessary to interfere with complex amplitudes of the signal light component and the reference light component, the polarization angle of polarizer 17 has to be set so that both of signal light component and the reference light component can be retrieved in predetermined ratio of both components.

When linear polarization components 17a and 17b of angle θ are retrieved from signal light component Jsig and reference light component Jref, a polarization of the Jones vector which is represented by formula 11 is obtained because signal light component Jsig and reference light component Jref are overlapped with each other. Actually, detector 18 detects a value which is in proportion to the squares of the absolute value represented by formula 12.

$$R(-\vartheta)\begin{bmatrix} J_{sig}\cos\vartheta + J_{ref}\sin\vartheta\exp(i\Delta\phi_s) \\ 0 \end{bmatrix} \quad \text{[Formula 11]}$$

$$|J_{sig}\cos\vartheta + J_{ref}\sin\vartheta\exp(i\Delta\phi_s)|^2 \quad \text{[Formula 12]}$$

When the phase shift amount of polarizer 17 is one of 0, π/2, π and 3π/2 at polarizer 17, four light intensities represented by formulas 13 are obtained at detector 18, respectively.

$$I_0 = |J_{sig}\cos\vartheta + J_{ref}\sin\vartheta|^2 \quad \text{[Formula 13]}$$
$$= |J_{sig}|^2\cos^2\vartheta + |J_{ref}|^2\sin^2\vartheta + 2\sin\vartheta\cos\vartheta\text{Re}(J_{sig}J_{ref}^*)$$

-continued $$I_{\pi/2} = |J_{sig}\cos\vartheta + iJ_{ref}\sin\vartheta|^2$$
$$= |J_{sig}|^2\cos^2\vartheta + |J_{ref}|^2\sin^2\vartheta + 2\sin\vartheta\cos\vartheta\text{Im}(J_{sig}J_{ref}^*)$$

$$I_{\pi} = |J_{sig}\cos\vartheta + J_{ref}\sin\vartheta|^2$$
$$= |J_{sig}|^2\cos^2\vartheta + |J_{ref}|^2\sin^2\vartheta - 2\sin\vartheta\cos\vartheta\text{Re}(J_{sig}J_{ref}^*)$$

$$I_{3\pi/2} = |J_{sig}\cos\vartheta + iJ_{ref}\sin\vartheta|^2$$
$$= \underbrace{|J_{sig}|^2\cos^2\vartheta + |J_{ref}|^2\sin^2\vartheta}_{A} - \underbrace{2\sin\vartheta\cos\vartheta\text{Im}(J_{sig}J_{ref}^*)}_{B}$$

The left part (represented by A) and the right part (represented by B) of each of formulas 13 are common components of the light intensities regarding the phase shift amount, respectively. Therefore, the left part (represented by A) and the right part (represented by B) of each of formulas 13 can be balanced out based on formula 14. Thus, the phase information can be retrieved by formula 15. The angle of polarizer 17 can be freely set in theory, except that the angle of polarizer 17 is not parallel to signal light component Jsig or horizontal polarization component 15a. However, when light intensity signal which is detected by light detector 18 is digitalized, because the number of intensity of a grayscale is limited, the angle of polarizer 17 is preferably set so that contrast of the intensity of the grayscale is large. The contrast of the intensity of the grayscale is best suited at the angle of polarizer 17 when the ratio of signal light component Jsig and reference light component Jref is 1.

$$\frac{I_\pi - I_0}{I_{\pi/2} - I_{3\pi/2}} = \frac{\sin(\Phi + \Phi_0)}{\cos(\Phi + \Phi_0)} \quad \text{[Formula 14]}$$

$$\Phi = \tan^{-1}\left[\frac{I_\pi - I_0}{I_{\pi/2} - I_{3\pi/2}}\right] - \Phi_0 \quad \text{[Formula 15]}$$

As described above, the present invention can balance out regarding information other than the phase information included in information light 16'. The present invention has a characteristic that the phase information is impervious to vibration, because common noises of the signal light component and the reference light component are balanced out and optical paths are communalized. Weakness of the holographic recording is overcome by such a characteristic. Further, the present invention can balance out regarding stray light of the signal light component and the reference light component in the method, because the stray light is generated mutually in the signal light component and the reference light component. Furthermore, because a signal value of reproduction light intensity and reproduction efficiency are not varied, a phase value is used as the phase information in range from −π to π, and it is easy that the phase information includes multilevel values. Therefore, according to the optical information reproduction/recording method of the present invention, a lot of information amount can be recorded in recording medium at one time.

Various reproduction information methods (hereinafter also referred to as retrieving information) other than the above is adapted as the present invention. For example, even when a variable phase-difference providing devise records the phase information by polarization basis of the horizontal polarization and the vertical polarization, and by the phase different between the horizontal polarization and the vertical polarization, the phase information can be reproduced by polarization basis of linear polarization at the polarization angle of 45 degrees and linear polarization at polarization at the angle of −45 degrees. In other words, a combination of the two polarization states can be different between recording of the phase information and reproduction of the phase information.

In the present invention, the polarization basis can be freely defined. For example, when the phase information is provided, a method, which directly provides the phase difference with the right and left circular polarization components (the right circular polarization component and the left circular polarization component), can be used. Further, another method for changing the horizontal polarization component and the vertical polarization component having the phase difference to the right and left circular polarization components, can be used. Furthermore, other method can be used. The phase difference between the right and left circular polarization components corresponds to the polarization angles of the linear polarization components.

Additionally, the linear polarization component corresponds to the reproduction light wave of the hologram. However, to detect the phase information of the reproduction light wave as a digital signal, as indicated in Patent Document 1, it is necessary that a light detector or an image sensor detects intensity of the reproduction light wave which is made interfere with the reproduction reference light with which the recording medium is not irradiated. In contrast, according to the optical information recording/reproduction method of the present invention, because information light 14', which is transmitted through recording medium 14 by irradiating with reproduction light 13', includes the reference polarization component, the phase information can be obtained by contrast of the light intensity, based on the intensity of the grayscale which is detected when the signal light component of information light 14' is made interfere with the reference light component of information light 14' at polarizer 17. In this case, there is no linear relationship between the obtained light intensity and the phase information. Further, the usable phase information is limited from $-\pi/2$ to $\pi/2$.

Ordinarily, when the precise phase information is detected, a polarization angle of a polarizer has to be adjusted so that the ratio of the signal polarization component and the reference polarization component is already know or 1. However, when the reference polarization component transmitted from recording medium 14 has the phase shifts of 0, $\pi/2$, $\pi$ and $3\pi/2$, and polarizer 17 overlaps the signal polarization component and the reference polarization component as common polarizations, the precise phase information can be retrieved based on the four intensity information of the combination lights of the signal polarization components and the reference polarization components. In principle, the precise phase information can be retrieved based on three among the four intensity information. Further, when the intensities of the combination lights are constant, and preprocessing is performed regarding the combination lights, the precise phase information can be retrieved based on two among the four intensity information. Therefore, based on this method, digitized signal light, which is formed by dividing the phase information from to it into two, three or more phase information, can be recorded and reproduced. As described above, when the phase shift method is not performed, the phase information is limited to a range from $-\pi/2$ to $\pi/2$, and effect based on noise increases. Then, the more the effect based on the noise increases, the more the phase information is represented by multilevel values. When the phase information is represented by two values, it is unnecessary to use the phase shift method and it is easy to identify the two values by only contrasting the intensity of the combination light.

Because light transmitted from an object, which has a birefringent structure, has phase distribution between polarization components according to information of the birefringent structure, the information of the birefringent structure of the object can be recorded and reproduced. When a recording medium, which has the information of the birefringent structure of the object, is irradiated with light which has the same information of the birefringent structure, the reference polarization component is reproduced adversely. Therefore, the intensity of the reference polarization component decreases when the light, which has the information of the birefringent structure and is transmitted to the recording medium, is different from the information of the birefringent structure of the recording medium. Thus, because the recording medium is functioned as a database to analyze the birefringent structure of an object, the optical information recording/reproduction method can be also used as a object shape detector.

A property to provide the phase difference between mutually orthogonal polarization components which are included in a birefringent object is expressed by "Retardance." Therefore, the optical information recording method is a technique to record a pattern of spatial Retardance which the birefringent object has, and the technique is expressed by "Retardagraphy." A recording medium on which the pattern of the spatial Retardance is recorded is expressed by "Retardergram".

Additionally, the reproduction light wave is affected by a deformation of a wave surface based on surface roughness of a optical system. However, the effect of the deformation of the wave surface is measured, and to remove the effect from the reproduction light wave can be performed.

Further, the present invention includes a method for holding the phase information as molecular orientation in the recording medium. Therefore, the present invention has a characteristic that the phase information can be re-written by convert the molecular orientation in the recording medium.

Further, because the signal light component and the reference light component are always overlapped with each other, the small-size devise performing the present invention can be produced.

(Recording Medium)

One of the elliptical polarization, the linear polarization, the circular polarization and so on can be selected as a polarization state during recording of a recording information. Therefore, for example, in a recording medium in which the phase information is recorded based on the linear polarization which has a polarization angle corresponding to the phase information, a material which reacts to the linear polarization, such as a material includes a photoresponsive molecule which has photoinduced birefringence property based on a polarization angle of the linear polarization, is used. Additionally, the photoinduced birefringence of the photoresponsive molecule means a property that molecular orientation is performed to a direction in which a polarization is not absorbed when absorbing the polarization by the photoresponsive molecule, and which has a birefringence which has a principal axis at a polarization angle depending on the molecular orientation.

Specifically, the material to induce birefringence, which has the principal axis corresponding to the polarization angle is preferably used as a material of the recording medium, when irradiating the recording medium with the linear polarization. In the present invention, it is necessary that the material in the recording medium reacts to a polarization state which is represented by an arbitrary polarization basis, and the reaction is fixed when performing recording/reproduction of optical information. However, according to the optical information recording/reproduction method in the present information, the reproduction light only has one of the polarization components (the reference light component) in a recording material on the recording medium, which reacts to the recording light which has a component ratio of the two polarization components in a polarization basis equivalent to 1. In other words, the reproduction light, which is different in a polarization state from the recording light, is transmitted to the recording medium, in which the birefringence having the principal axis reacted to the recording light. Therefore, the polarization modulation is performed regarding the reproduction light in the recording medium. The polarization modulation means generation of another light component (signal light component) which is not included in the reproduction light before transmitting to the recording medium. Further, amplitude and phase of the signal light component depend on a size of the birefringence induced on the recording medium and a polarization angle of the principal axis of the birefringence, respectively. The recorded phase information is retrieved by interfering with complex amplitude of the signal light component and complex amplitude of the reference light component in a predetermined component ratio.

Push-pull azobenzene is preferably used as a material of the recording medium in which the phase information is recorded based on the linear polarization. When azobenzene absorbs the linear polarization, in azobenzene the molecular re-orientation is performed in a direction perpendicular to a polarization angle of the linear polarization. Further, the birefringence which has the principal axis at the polarization angle is produced. In other words, azobenzene has a characteristic that the photo-orientation is performed in the direction perpendicular to the polarization angle of the recording light. In this case, the linear polarization can be represented by a combination of the right circular polarization component and the left circular polarization component. Further, because the polarization angle of the linear polarization corresponds to the phase difference between the two circular polarization components, an arbitrary phase difference can be recorded in the recording medium as the main angle of the birefringence, by adjusting the phase difference.

Azobenzene copolymer (methacrylate polymer having cyanoazobenzene and bisazobenzene as a side-chain (the molecular weight of about ten thousand)) called PCDY50 is preferably used as a material of the recording medium. The azobenzene copolymer has structure of an amorphous phase or an achiral phase, and the photo-orientation of the azobenzene copolymer is performed stably. Therefore, the azobenzene copolymer is preferably used as a material of the recording medium. For example, a film of the azobenzene copolymer can be formed on a glass substrate by an application means, such as a spin-coating. In the example discussed later, thickness of the film of the azobenzene copolymer is about 700 nm-900 nm. Additionally, the cyanoazobenzene which is one of side-chains of the azobenzene copolymer has a high photoresponsiveness, and functions as a trigger (hereinafter also referred to as "a photoinduced re-operation trigger") to perform the photo-reorientation based on photoinduction. Further, the bisazobenzene which is another side-chain of the azobenzene copolymer has a high molecular birefringence, and is arranged parallel to the cyanoazobenzene which is left side-chain of the azobenzene copolymer.

Further, for example, when recording information which is recorded in a recording medium is represented by elliptical polarization which is configured by a combination of the two orthogonal circular polarization components, a recording medium, in which the recording information is able to directly recorded by the elliptical polarization can be used. Such a recording medium has an advantage that the recording information can be directly recorded in the recording medium without conversion of the horizontal polarization component and the vertical polarization component to the right and left circular polarization components. In this case, the phase difference between the horizontal polarization component and vertical polarization component corresponds to an ellipticity of the elliptical polarization. Therefore, when such a recording medium is used, the phase difference between the two orthogonal circular polarization components in the elliptical polarization can be used as the recording information.

The phase difference between the two orthogonal circular polarization components corresponds to the phase difference of the phase information. Therefore, the optical phase information can be reproduced by performing a polarization analysis of a polarization state of the information light including the two orthogonal circular polarization components in a known method of a commercially-supplied polarization measuring device.

Also, a material which does not include azobenzene and has the same function as azobenzene can be preferably used as a material of the recording medium. Specifically, this material is a photocrosslinkable material at a polarization angle. For example, a photocrosslinkable polymer liquid crystal material which has 4-4-methoxycinnamoyloxy biphenyl in a side chain as a photocrosslinking material can be used as a material of the recording medium. As a material of the recording medium other than the photocrosslinking material, photo-polymer which has dichroism pigment can be used. Such a recording medium having one of the above materials has different sensitive material from a conventional sensitive material (a material which reacts to only light intensity and does not react to the polarization). When a specific azobenzene material which has chirality is used as a material of the recording medium, there is a possibility that the phase information is recorded in the recording medium by the elliptical polarization which includes two linear polarization components having an arbitrary phase difference, in order to identify not only the two linear polarization components, but also the right and left circular polarization components.

Hereinafter, a recording principal when an optical anisotropic material is used like azobenzene material is described in detail.

When the recording light in a polarization state is transmitted to the recording medium, optical anisotropy is induced in the recording medium based on the transmitted recording light. For example, the optical anisotropy is a characteristic that refractive indexes (double refractions) of two orthogonal polarization components are different from each other. However, the two principal axes of the optical anisotropy are different from the two polarization basis vectors of the recording light. For example, when a polarization basis of the optical information which includes the right and left circular polarization components is used, the component ratio of the right and left circular polarization components is 1, and the phase difference between the right and left circular polarization components is 0, the horizontal polarization is transmitted to the recording medium. In this case, when a material of azobenzene series is used in the recording medium, the birefringence which has the two principal axes of 0 degrees and 90 degrees is induced. A combination of the linear polarization component (the horizontal polarization component) which has the principal axis of 0 degrees and the linear polarization (the vertical polarization component) which has the principal axis of 90 degrees is different from the polarization basis of the recording light. In this case, the only condition is that the reproduction light is polarized in order to reproduce the recorded phase information. However, in this case, it is necessary that a polarization state has to be configured by only the reference light component in the recording medium. In other words, it is necessary that the reproduction light only includes one of the right and left circular polarization components. For example, when irradiating the recording medium with the reproduction light which includes the reference light component configured by the left circular polarization component, the light transmitted through the recording medium is configured by the elliptical polarization. This is because the horizontal polarization component and the vertical polarization component included in the light transmitted to the recording medium have the phase difference based on the birefringence of the recording medium, and the light transmitted though the recording medium does not become the left circular polarization component. In other words, in view of the polarization basis of the circular polarization, it is assumed that the right circular polarization component is produced in the recording medium. In this case, if the component ratio of the produced right circular polarization component and the transmitted left circular polarization component is 1, in the reproduction light, the linear polarization is particularly produced by these components after transmitting though the recording medium. Actually, in the reproduction light, the elliptical polarization is produced by these components after transmitting though the recording medium. Thus, it is assumed that the reproduction light transmitted though the recording medium is a combination of the signal light component and the reference light component, and the phase information is retrieved from the recording medium based on analysis of the reproduction light. Further, these matters indicate that the polarization state of the reproduction light includes a single light component based on the definition of the used polarization basis. For example, when the circular polarization basis is used, the reproduction light only includes a single left circular polarization component. Additionally, the left circular polarization is represented by two polarization components other than the left circular polarization component. However, in this case, because the calculation is performed based on the circular polarization basis, it is not easy to retrieve the information included in the reproduction light based on the polarization state of the reproduction light. The key point of the present invention is how the phase information included in the reproduction light is retrieved, as well as being able to show a vector in a plan by the sum of arbitrary two orthogonal vectors. Therefore, although photoinduced birefringence of azobenzene is known from about 10 years ago, one of the reasons is that the present invention has never invented.

(Optical Information Recording/Reproduction Device)

Figure 5:
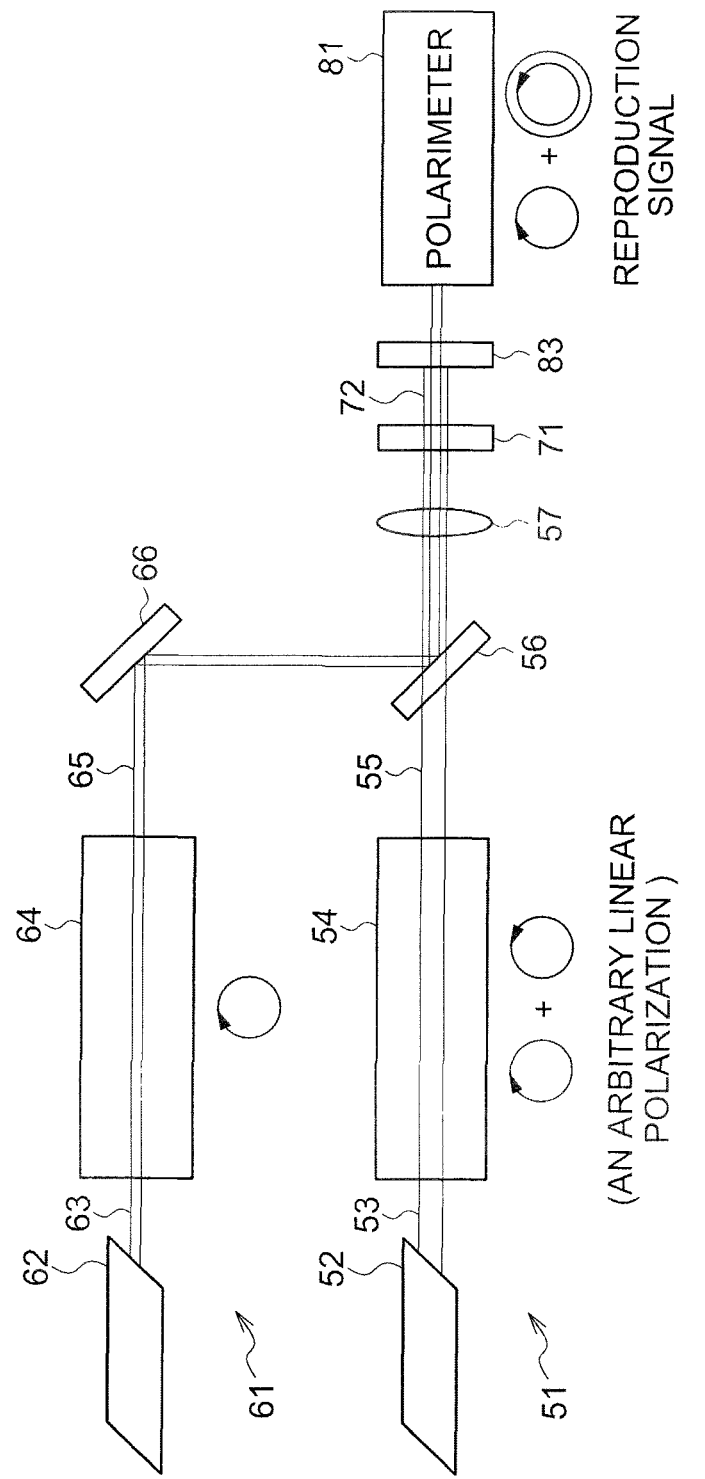
FIG. 5 is a schematic configuration diagram showing one example of the optical information recording/reproduction device of the present invention.

Next, the optical information recording/reproduction device of the present invention is described in detail. FIG. 5 is a schematic configuration diagram showing one example of the optical information recording/reproduction device in the present invention. The optical information recording/reproduction device 50 is one example of the device that performs the above optical information recording/reproduction method in the present invention. The optical information recording/reproduction device 50, as shown in FIG. 5, has: recording light generator 51 which generates recording light 55 in a polarization state, which has two mutually orthogonal polarization components with the phase difference between the two polarization components in an arbitrary polarization basis; reproduction light generator 61 which generates reproduction light 65 in a polarization state, which has a single polarization component in an arbitrary polarization basis; recording medium 71 in which optical information included in recording light 55 is recorded and from which the recorded optical information is retrieved based on reproduction light 65; and a optical information detector (as represented by "polarimeter 81" in FIG. 5) which detects information light 72 produced by irradiating recording medium 71 with reproduction light 65.

Recording light generator 51 generates recording light 55 in a polarization state which has two mutually orthogonal polarization components with the phase difference between the two polarization components in an arbitrary polarization basis. Recording light generator 51, as shown in FIG. 5, has: recording light leaser 52; polarization production unit 54 which produces recording light 55 in a polarization state, which has two mutually orthogonal polarization components with the phase difference between the two polarization components in an arbitrary polarization basis, based on leaser light 53 transmitted from recording light leaser 52; variable phase difference providing unit (as included in polarization production unit 54 in FIG. 5), which provides two orthogonal polarization components in polarization production unit 54 with the phase difference (the phase information); and a polarization basis converter (as included in polarization production unit 54 in FIG. 5), which converts the polarization basis according to a recording material property.

Recording laser 52 can be configured by a solid state laser which has small size comparatively, and a range of wavelength (the wavelength of 400 nm-550 nm when azobenzene material is used) to which recording medium 71 reacts, such as a semiconductor laser (laser diode) and a Nd:YAG laser. For example, recording laser 52 can be configured by laser diode (wavelength of 400 nm-410 nm) for the BD.

Polarization generator 54 and the polarization basis converter (as included in polarization production unit 54 in FIG. 5) are configured by a polarizer, a quarter-wave plate and a half-wave plate, a compensator and so on.

The variable phase difference providing unit (as included in polarization production unit 54 in FIG. 5) can be configured by a conventional and known variable phase retarder, and a phase-type spatial light modulator which is able to vary a retardance pattern. The variable phase retarder is a device to uniformly convert the phase difference. The variable phase retarder has plural pixels which are arranged in a reticular pattern, and structure so that phase of output light can be modulated on a pixel to pixel basis. Specially, the phase-type spatial light modulator can be configured by a liquid crystal element and a magneto-optical element. In the liquid crystal element, when liquid crystal molecules which have rod-shaped molecular structure are oriented in the same direction, the birefringence, which has the principal axis perpendicular to a axis which is parallel to the molecular orientation, is produced. Based on the birefringence, the phase difference is provided to the two orthogonal linear polarization components. Further, because degree of the orientation of the molecular orientation can be modulated electrically, the liquid crystal element can be used as a variable phase retarder. On the other hands, the phase-type spatial light modulator can change provided voltage in a pixel to pixel basis, the phase spatial light modulator provides the polarization component with two-dimensional phase distribution. The magneto-optical element has a characteristic to rotate a polarization angle based on magneto-optical effect. The rotation of the polarization angle is represented by conversion of the phase difference of the two orthogonal circular polarization components in a polarization state of a circular polarization basis. Further, the phase difference (the rotational polarization angle) can be converted by changing magnetic field intensity of the phase-type spatial light modulator. Although now the phase-type spatial light modulator which uses the magneto-optical effect does not have the sufficient property, in the feature, the phase-type spatial light modulator can be used. Additionally, the liquid crystal element functions as a variable phase retarder based on the linear polarization basis, and magneto-optical element functions as a variable phase retarder based on the circular polarization basis.

Reproduction light generator 61 generates reproduction light 65 in a polarization state, which only has a single polarization component in an arbitrary polarization basis. Reproduction light generator 61, as shown in FIG. 5, has: reproduction laser 62; polarization basis production unit 64 which produces in an arbitrary polarization basis a polarization state, which only has a single polarization component among the polarization components included in laser light 63; and a polarization basis converter (as included in polarization basis generator 64 in FIG. 5), which converts the polarization basis produced in polarization basis generator 64.

When a write-once recordable medium is used or when intensity of laser light is controlled so that an rewritable recording medium does not react, recording laser 62 is configured by a solid state laser which has a range of wavelength to which recording medium 71 reacts, as similarly recording leaser 52, such as a semiconductor laser and a Nd:YAG laser. Further, when the over-write recordable medium is used, recording laser 62 can be configured by a laser diode which has a wavelength (more than 600 nm when azobenzene material is used) to which the recording medium does not react.

Recording medium 71 has the optical information which is recorded by the recording light and which is reproduced based on reproduction light 65. Recording medium 71 is formed by a material which includes a photoresponsive molecule which has a photoinduced birefringence property in a polarization state represented by an arbitrary polarization basis. For example, as described above, the material which includes push-pull azobenzene is preferably used as a material of recording medium 71. Additionally, a photoinduced birefringence state of the photoresponsive molecule is a state in which the molecular orientation is performed to a direction in which the light in a predetermined polarization state is not absorbed, because the photoresponsive molecular absorbs the light in the predetermined arbitrary polarization state. Further, the photoinduced birefringence state is a state in which a birefringence which has the principal axis at a polarization angle of the molecular orientation is produced. In the present invention, because recording medium 71 which has such a property is used, the photoinduced birefringence is produced in recording medium 71 by irradiating the recording medium with the polarization in an arbitrary polarization basis during recording of the phase information. Further, in the present invention, during reproduction of the phase information, the phase information can be retrieved from the polarization state converted by the birefringence in recording medium 71 based on irradiation of the polarization including a single polarization component in an arbitrary polarization basis.

The optical information detector (that is polarimeter 81, the same shall apply hereinafter) retrieves information light 72 produced by irradiating recording medium 71 with reproduction light 65, and detects the optical information from information light 72. Polarimeter 81 retrieves the phase information from information light 72 produced by irradiating recording medium with reproduction light 65 by the phase shift method or the polarization analysis. Polarimeter 81 performs the reproduction of the phase information by the light which has a wavelength different from the recording light. In this case, when the reproduction of the phase information is performed, the optical information detector performs interception of the recording light by color filter 83.

Color filter 83 only transmits light which has a wavelength range including the reproduction light, and absorbs the recording light.

When the phase information is retrieved by the phase shift method, polarimeter 81 has: a polarizer or a polarization beam splitter which interferes with a phase retarder for shifting phase of irradiated light or which performs polarization interference; and a light detector which detects light intensity obtained by performing the polarization interference. Further, when the phase information is retrieved by the polarization analysis, polarimeter 81 has a Stokes polarimeter which measures a Stokes parameter to perform the polarization analysis.

Specifically, polarimeter 81, as shown FIG. 4 (hereinafter as represented by reference number of FIG. 4), has: quarter-wave plate 15 which performs a polarization-basis conversion of information light 14' transmitted in recording medium 14 from a circular polarization basis to a linear polarization basis; variable phase retarder 16 which provides a shift amount between the two orthogonal polarization components, which is included in information light 15' transmitted though quarter-wave plate 15; polarizer 17 which provides a polarization angle to information light 16' transmitted though variable phase retarder 16; and detector 18 which detects intensity of information light 17' transmitted though polarizer 17.

Variable phase retarder 16 can be configured by a variable phase retarder, which electrically modulates degree of orientation of the liquid crystal molecule in a linear polarization basis. Further, phase retarder 16 can be configured by a magneto-optical element which provides phase difference to the two orthogonal polarization components based on the magneto-optical effect.

Detector 18 has multiple pixels arranged in a reticular pattern and is an element which can detect the intensity of received light on a pixel to pixel basis. Specifically, detector 18 can be configured by a CCD-type solid-state image sensor or a MOS-type solid-state image sensor. Further, detector 18 may be configured by a smart optical sensor, in which the MOS-type solid-state image sensor and a signal processing circuit are integrated on a one-chip. Additionally, to focus information light on each of the pixels in detector 18, a micro lens array (not shown), which has plural micro lenses arranged at a position facing to a receiving face of each of the pixels in detector 18, can be provided in detector 18.

The optical information recording/reproduction device is housed in an optical head, as similarly an optical memory such as the known BD and the known HD-DVD. The optical head has a head body mounting some elements, and a recording laser and a reproduction laser (when the recording light and the reproduction light are different in wave length) are mounted by a support member in a based in the head body. Further, in the head body, some elements of the optical information recording/reproduction device in the present invention as described above is mounted, such as the spatial light modulator, the detector, the mirror, the dielectric mirror and the quarter-wave plate.

In the present invention, the elements of the optical head includes a lens which focuses the recording light and the reproduction light on the recording medium, as similarly the known optical memory. In the present invention, an imaging lens system is mounted in the optical head and can generate a miniature pattern of the recording light or the reproduction light on the recording medium.

Figure 7:
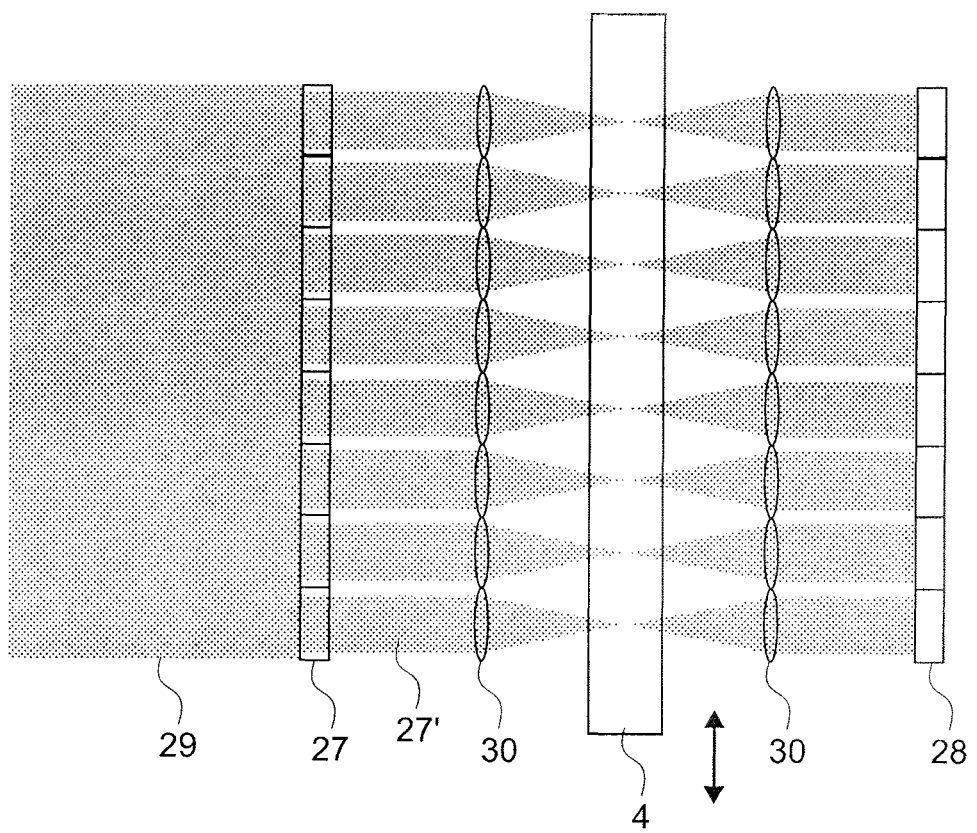
FIG. 7 is a schematic configuration diagram showing one example of the optical information recording/reproduction device.

FIG. 7 is a schematic configuration diagram showing one example of the optical information recording/reproduction device of the present invention. The optical information recording/reproduction device shown in FIG. 7 is a space-saving type and is configured by sandwiching recording medium 4 between polarization generator 27, which is arranged at a light source 29 side, and optical information detector 28. Polarization generator 27 has a spatial light modulator which has a birefringence property, and can generate the recording light and the reproduction light. In the optical information recording/reproduction device, micro lens arrays 30, 30 are arranged between polarization generator 27 and recording medium 4 and between optical information detector 28 and recording medium 4. Further, micro lens arrays 30, 30 are arranged at positions at which modulation light 27', which is produced by modulating light from light source 29 at polarization generator 27, can be focused in recording medium 4. The phase information is recorded around each of focus points. When recording medium 4 is moved to the direction shown by the arrow in FIG. 7, the other phase information can be recorded at a region of the recording medium at which information has not recorded yet. Therefore, the phase information is recorded in and reproduced from the recording medium in high density. Further, the optical information recording/reproduction device can perform the point reproduction based on the planar recording, and the planar reproduction based on the point recording, as described above. Additionally, in FIG. 7, although the focus points are arranged in line on the paper of FIG. 7, the focus points can be arranged to a direction perpendicular to a plane of the paper of FIG. 7 and the optical information recording/reproduction device can have a single focus point.

As described above, according to the optical information recording/reproduction method and device, the optical information is recorded by irradiating the recording medium with the recording light of the polarization state which has the two orthogonal polarization components having the phase difference in an arbitrary polarization basis. Then, the recorded optical information is reproduced by irradiating the recording medium with the reproduction light of the polarization state which only has a single polarization component in an arbitrary polarization basis. Therefore, the optical phase information recorded in the recording medium can be reproduced by the polarization analysis method. Also, the polarization modulation can be performed without conversion of the polarization axis, and further, it is not necessary that the recording light and the reproduction light are divided to two beams, as like holography. Therefore, the optical system can be simplified, and effects by vibrations can be suppressed. Further, according to the optical information recording/reproduction method of the present invention, because the signal light component and the reference light component, which are two mutually orthogonal polarization components included in the recording light and the reproduction light, the signal light component can be only modulated when the signal light component and the reference light component are overlapped with each other. In the result, it is not necessary that the recording regions are separated as like the holographic recording, and the high-capacity information is recorded at once.

EXAMPLES

Figure 6:
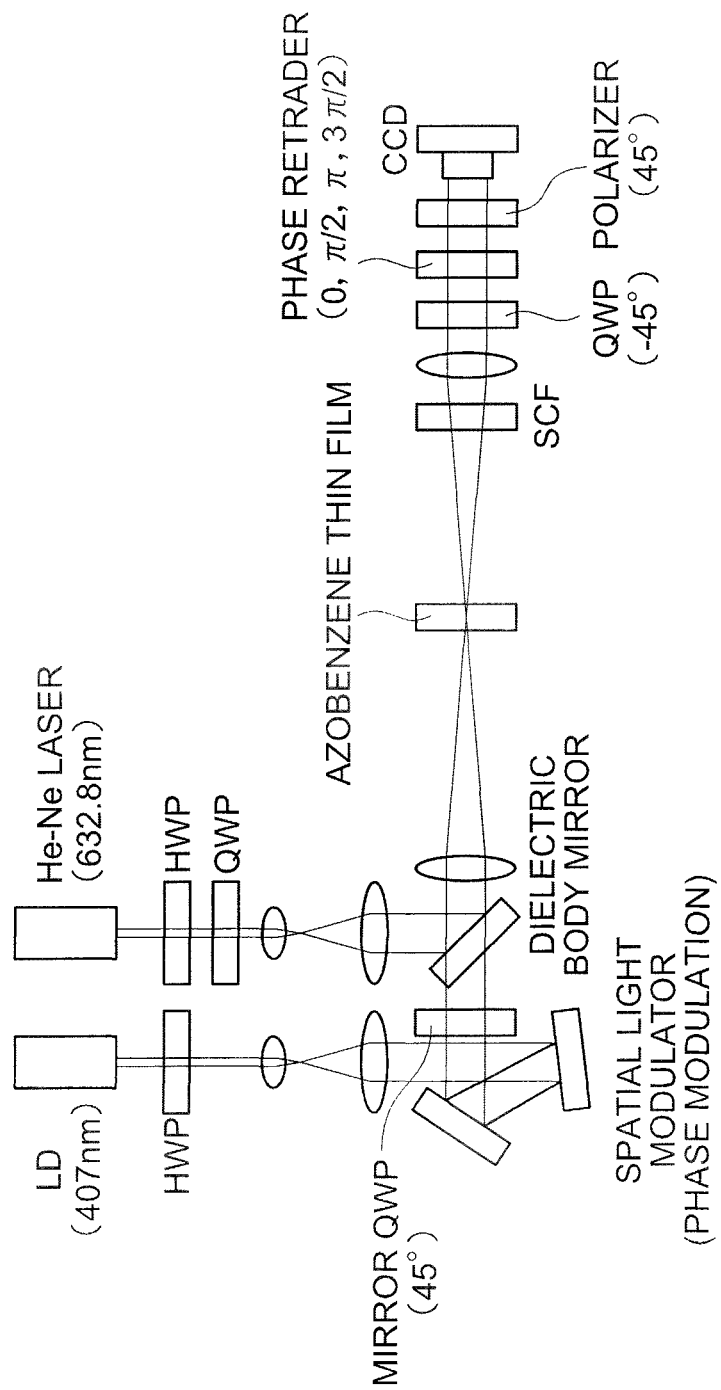
FIG. 6 is a schematic configuration diagram showing the optical system which performs the experiment.

Next, an example of an experiment of the optical information recording/reproduction method is described. FIG. 6 is a schematic configuration diagram showing the optical system which performs the experiment. In FIG. 6 "LD" represents a laser diode, "HWP" represents a half-wave plate, "QWP" represents a quarter-wave plate, and "SCF" represents a color filter. As a laser to output the recording medium, laser diode LD which outputs laser light having the wavelength of 407 nm was used, and a thin film of azobenzene copolymer which has good photoresponsiveness was used in the recording medium. Recording power of the recording laser light was 8 mW in front of the thin film of azobenzene copolymer, and the recording time was 10 seconds. The He—Ne laser which outputs laser light having the wavelength of 632.8 nm was used in order to reproduce without destruction and in order not to absorb in the thin film of azobenzene copolymer. The phase information was provided by a phase-type spatial light modulator, as a two-dimensional phase pattern.

The reproduction of a recording phase pattern in thin film of azobenzene copolymer was performed by shooting the four intensity distribution by the CCD camera with the phase shift method. Based on the obtained reproduction phase pattern, reproduction of the recorded phase pattern is shown, and the recording and reproduction of the two dimensional phase information can be performed.

(Retardagraphy)

Figure 8:
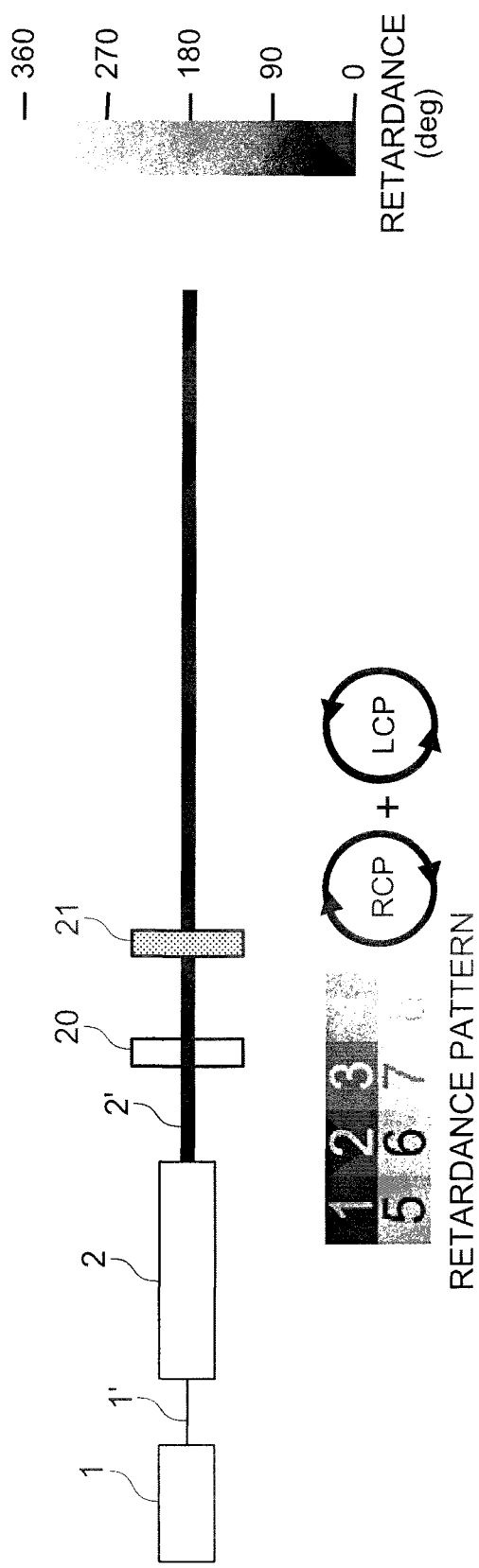
FIG. 8 is a schematic configuration diagram showing the retardagraphy.

Next, a retardagraphy is described. FIG. 8 is a schematic configuration diagram showing the retardagraphy. As shown in FIG. 8, when irradiating an object (hereinafter, referred to as "retardance object 20") with linear polarization 2' which is produced by modulating laser light 1' transmitted from recording laser 1 at polarization modulator 2, the phase difference between two polarization components (RCP, LCP), which are right and left circular polarization components (for example, right circular polarization (RCP) and left circular polarization (LCP) is generated. The retardagraphy is a technique in order to record the phase information in recording medium 21, which has the polarization responsiveness, based on recording light 20' which has the phase difference.

It is necessary that retardance object 20 has retardance in right and left circular polarization (RCP, LCP) which have enough phase difference. Usually, a retardance object, which has the retardance in the two orthogonal linear polarization components 2', is used. Retardance object 20 is configured by a liquid crystal spatial light modulator in a parallel aliened. In the feature, the retardance object which has the retardance of the right and left polarizations (RCP, LCP) may be configured by a magneto-optical spatial light modulator which is researched and developed now. For example, as a magneto-optical spatial light modulator, the liquid crystal, liquid crystal element which is included in LCOS (Liquid Crystal on Silicon) type spatial light modulator 10468 produced by Hamamatsu photonics K.K. can be used.

(Reproduction of a Conjugate Wave)

FIGS. 9(A) and 9(B) are schematic configuration diagrams showing an example of a reproduction system that reproduces retardergram (the recording medium in which retardance is recorded) 22. When the retardance is reproduced from the recording medium, as shown in FIG. 9(A), a polarization component (reference light component) which is a reference polarization component of the phase difference is transmitted to the recording medium. For example, when the phase difference between right circular polarization (RCP) and left circular polarization (LCP) based on the right circular polarization (RCP) is recorded, the phase difference is reproduced by the left circular polarization (LCP). However, the present inventors tested the reproduction of the conjugate wave which is one of characteristics of the hologram, by an experiment that irradiates the recording medium with the right circular polarization opposite to the reference light component (the left circular polarization).

The orthogonal right circular polarization (RCP) in formula 7 is represented by the Jones vector in formula 16. When performing the matrix operation of the Jones matrix in formula 5 to the Jones vector in formula 16, the Jones vector in formula 17 is calculated.

$$\frac{\sqrt{2}}{2} \exp\left(-i\frac{\pi}{4}\right) \begin{bmatrix} 1 \\ i \end{bmatrix} \quad \text{[Formula 16]}$$

$$-i\exp(i\alpha + i\Delta\phi/2)R(-\alpha)R\left(\frac{\pi}{4}\right)\begin{bmatrix} -i\sin(\Delta\phi/2 - \pi/4) \\ \cos(\Delta\phi/2 - \pi/4) \end{bmatrix} \quad \text{[Formula 17]}$$

Further, when the Jones vector in formula 17 is modified to a combination of the horizontal and perpendicular linear polarization components by the quarter-wave plate included in optical information detector 24 (the same as polarimeter 81 in FIG. 5).

$$\sin\left(\frac{\Delta\phi}{2}\right)\exp\left(-i\frac{\Delta\phi}{2}\right)\begin{bmatrix} -i\cot(\Delta\phi/2) \\ \exp[-i(\Phi + \Phi_0)] \end{bmatrix} \quad \text{[Formula 18]}$$

The signal light component (a horizontal polarization component) in formula 10 represents a wavefront of light, which is transmitted from a position where the retardance object is placed, on the retardergram. Therefore, in FIG. 9(A), the light transmitted from the retardergram 22 is observed so as to be transmitted from the position 25 where the retardance object is placed. Because the signal light component (a vertical polarization component) in formula 18 has a conjugate relation with the signal light component in formula 10, the wavefront of the signal light component in formula 18 is transmitted so that the wavefront of the signal light component in formula 10 go back in time. Therefore, as shown FIG. 9(B), an image of the retardance pattern is formed at position 26 which is symmetrical to the position 25 where the retardance object is placed by centering on retardergram 22.

For example, when performing the reproduction by the optical system in FIG. 9(A), the light transmitted from retardergram 22 is observed so as to be transmitted from position 25 where the retardance object is placed. Therefore, an image of the retardance pattern is obtained at optical information detector 24, by focusing two lenses 23, 23 at position 25. On the other hand, when performing the reproduction of the conjugate wave, as shown in FIG. 9(B), the recorded retardance pattern is formed at position 26 other than position 25. Therefore, when the same optical system in FIG. 9(A) is used, defocus is occurred. The present inventors invent a method and system that can reproduces the same retardance pattern as the recorded retardance pattern, by adjusting a focusing system which has two lenses 23, 23, so as to form the image based on the conjugate wave at position 26 which is symmetrical to the position 25 where the retardance object is placed.

FIG. 10 is a schematic configuration diagram showing one example of the recording/reproduction device which performs the reproduction of a conjugate wave. Polarization production unit 27 has the spatial light modulator which has the birefringence. Polarization production unit 27 and optical signal detector 28 are placed at respective positions of symmetry by centering recording medium 22. Then, conjugate wave forms the image in optical signal detector 28. Therefore, according to the configuration of the recording/reproduction device, the recording/reproduction device does not need any lens and can have a small-sized optical system. Further, in order to increase record density, polarization production unit 27 and optical signal detector 28, which have pixel size as great as an optical wave length, are preferably used.

FIG. 11 is a schematic configuration diagram showing one example of a reflection type recording/reproduction device which has an optical information detector at a light source side in view of the recording medium. In FIG. 11 "HWP" represents a half-wave plate, "QWP" represents a quarter-wave plate, and "SF" represents a space filter, "PBS" represents a polarization beam splitter, "VFR" represents a variable faraday rotator, "VR" represents a variable retarder, and "LC-SLM" represents a parallel alliened liquid crystal spatial light modulator. Recording/reproduction device 34 is an example of a device which performs the reproduction of a conjugate wave. In recording/reproduction device 34, a mirror is placed at a back side of recording/reproduction device 22. Recording/reproduction device 34 has an imaging system that is formed by parallel alliened liquid crystal spatial light modulator LC-SLM which is an information source, the mirror and an image sensor configure.

First, in FIG. 11 a polarization state of laser light transmitted from a recording/reproduction laser is converted to horizontal polarization at two wave plates (a half-wave plate and a quarter-wave plate). Next, the horizontal polarization converted to parallel light at the space filter is transmitted to the polarization beam splitter thought which transmits the horizontal polarization component and at which reflects the vertical polarization component.

Then, the variable faraday rotator and a variable phase retarder is turned off (a state not to polarization-modulate) during recording the phase information. The horizontal polarization component is converted at the half-wave plate to the linear polarization component which has the polarization angle of 45 degrees, and is provided with the phase information between the horizontal polarization component and the vertical polarization component in the parallel alliened liquid crystal spatial light modulator (LC-SLM). The phase information is converted at the quarter-wave plate to the linear polarization pattern which has a polarization angle corresponding to the phase information. Then, the linear polarization pattern is downscaled and recorded in the recording medium.

On the other hand, during reproducing of the optical information, the polarization state of laser light transmitted from a recording/reproduction laser is converted to the horizontal polarization at the variable faraday rotator and the half-wave plate. The variable phase retarder provides the phase difference between the horizontal polarization component and the vertical polarization component by the phase shift method, without providing light only including the vertical polarization with anything. The parallel aliened liquid crystal spatial light modulator (LC-SLM) maintains a state which does not provide the phase difference, the converted vertical polarization component is converted to the left circular polarization component at the quarter-wave plate. Then, the left circular polarization component is converted to the elliptical polarization component, which has the polarization angle corresponding to the recording information, at recording medium 22. When re-transmitting the elliptical polarization reflected at the mirror from a back side to the recording medium, the left circular polarization component is converted to the right circular polarization component. Further, when the phase information recorded in the recoding medium is retrieved based on the light transmitted from the back side to a space filter side, a sign of the light including the phase information retrieved from the recoding medium is opposite to a sign of the light including the phase information based on the light transmitted from the recording/reproduction laser. Therefore, when transmitting the left circular polarization to the recording medium from the mirror side, the conjugate wave (the left circular polarization) includes the original phase information. The reproduction signal (the right circular polarization) retrieved based on the light transmitted to the recording medium from a front side is converted to the left circular polarization at the mirror. Therefore, the front side reproduction signal is overlapped with the back side reproduction signal, and these two reproduction signals become one signal light component (the left circular polarization). Additionally, the mirror can be placed on a back surface of recording medium 22. When the signal light component configured by the left circular polarization and the reference light component configured by the right circular polarization are transmitted though the quarter-wave plate, the signal light component and the reference light component are converted to the vertical polarization component and the horizontal polarization component, respectively. The phase shift method is performed at the variable phase retarder regarding the converted vertical polarization component and the converted horizontal polarization component. Further, the vertical polarization component (the signal light component) and the horizontal polarization component (the reference light component) are converted to a pair of other orthogonal linear polarization components (for example, the pair of linear polarization components which have the polarization angles of 45 degrees and −45 degrees, respectively) at the half-wave plate and the variable faraday rotator. Further, each of vertical polarization components are reflected at the polarization beam splitter, and finally vertical polarization components included in the pair of the orthogonal linear polarization components are transmitted to the image sensor. Therefore, the optical information can be reproduced.

(Volume Recording)

Next, the volume recording is described. When a recording medium which has thickness more than a wavelength of the recording and reproduction laser is used, a three-dimensional birefringence pattern can be produced in the recording medium. The three-dimensional birefringence pattern can be produced by plural spots, as described in FIG. 7, and can be produced by transmitting multiple recording light. FIGS. 12 and 13 are schematic diagrams to describe the volume recording. Reference number 36 of FIGS. 12 and 13 is a medium plane of volume recording medium 35. When performing the three dimensional recording of the present invention, high-capacity recording (the same as the holographic memory) can be performed in volume recording medium 35. The volume recording is simply described by one example of a binary recording when the phase differences are 0 and $\pi$ only.

When the signal light component is configured by the right circular polarization component, the reference light component is configured by the left circular polarization component, and the phase difference between the right and left circular polarization components is 0, the recording light is configured by the horizontal polarization component. Then, when the phase difference between the right and left circular polarizations is $\pi$, the recording light is configured by the vertical polarization component. As shown in FIG. 12, when a pattern configured by the horizontal polarization component and the vertical polarization component is recorded in the recording medium which has arbitrary thickness in the same side, the birefringence which has the principal axis corresponding to a polarization angle of the horizontal polarization component and the vertical polarization component is induced. Specifically, when a film of azobenzene is used in the recording medium, the principal axis has a low refraction index regarding polarization which has a polarization angle parallel to the recorded polarization angle. In contrast, when a film of azobenzene is used in the recording medium, the principal axis has a high refraction index regarding polarization which has a polarization angle perpendicular to the recorded polarization angle. Thus, because there are two principal axes, the principal axis which has a low refraction index is used as a principal axis hereinafter in the following description. Further, although the light is not linearly transmitted in reality, it is assumed that light is linearly transmitted in order to simplify the description.

FIG. 13 is a diagram showing an example when two information light patterns are recorded at angles different from each other. Although FIG. 13 shows the same information light patterns, the different information light patterns can be recorded in the recording medium. Further, in real configuration to rotate the recording medium is simpler and more preferable than to change an angle of incidence. The birefringence value (the difference of the refection index between the two principal axes) increases more when the horizontal polarization component includes the principal axis of the birefringence of 0 degrees, and the birefringence value decreases when the horizontal polarization component includes the principal axis of the birefringence of 90 degrees by canceling each other. On the other hand, the birefringence value increases more when the vertical polarization component includes the principal axis of the birefringence of 90 degrees, and the birefringence value decreases more when the vertical polarization component includes the principal axis of the birefringence of 0 degrees by canceling each other. In FIG. 13, an overlap part between the same type polarization components, such as an overlap part between the vertical polarization components and an overlap part between the horizontal polarization components, means that the birefringence value is high.

As shown in FIG. 13, a multiple recorded part is a three-dimensional pattern of the birefringence. The left circular polarization component is transmitted to the recording medium two or more times with changing the angles of incidence, the same as during recording the three-dimensional pattern, and the three-dimensional pattern and the recording information can be retrieved from the recording medium by performing reconfigure of three-dimensional configuration based on the projection-slice theorem. The projection-slice theorem is that the two-dimensional Fourier spectrum corresponds to the cross-section which includes an origin position in a three-dimensional Fourier space of the three-dimensional configuration when performing orthographic projection of the three-dimensional configuration from an arbitrary angle. Three-dimensional Fourier space can be interpolated by cross-sections based on the projection two or more times with change of the angles. Further, the three-dimensional configuration can be reconfigured by the inverse three-dimensional Fourier transform. According to the optical diffractive effect, three-dimensional Fourier space can be interpolated even when the cross-sections are curved surfaces. Further, the hologram memory can perform the high capacity recording by the multiple recording system different from that of the volume recording. The three-dimensional recording has simple configuration equal to or more than the holographic memory.

As just described, the optical information recording/reproduction method in the present invention can reproduce the information included in the three-dimensional birefringence pattern, by transmitting the reproduction light to the recording medium two or more times, after transmitting the recording light to the recording medium two or more times and recording the three-dimensional birefringence pattern in the recording medium. In this case, as described above, the information included in the three-dimensional birefringence pattern can be preferably retrieved by performing reconfigure of three-dimensional configuration based on the projection-slice theorem.

Further, in the optical information recording/reproduction device of the present invention, when the optical information detector which is a part of a whole device retrieves the phase information from some intensity information obtained by the phase shift method and polarization interference based on the signal light component and the reference light component included in the information light which is transmitted from the recording medium, and the three-dimensional birefringence pattern is formed by irradiating the recording medium with the recording light two or more times, the reproduction of the information included in the three-dimensional birefringence by transmitting the reproduction light to the recording medium two or more times can be performed. In this case, as similarly above method, the information included in the three-dimensional birefringence pattern can be retrieved by performing reconfigure of the three-dimensional configuration based on the projection-slice theorem.

DESCRIPTION OF SYMBOLS

1 Recording laser
1' Laser light
2 Polarization modulator
2' Modulation light
3 Quarter-wave plate
3' Recording light
4 Recording medium
11 Reproduction laser
11' Laser light
12 Polarization modulator
12' Modulated light
13 Quarter-wave plate
13' Reproduction light
14 Recording medium
14' Information light
14a Right circular polarization
14b Left circular polarization
15 Quarter-wave plate
15' Reproduction light (information light)
15a Horizontal polarization component
15b Vertical polarization component
16 Variable phase retarder
16' Information light
17 Polarizer
17' Information light
17a, 17b Linear polarization component
18 Detector
20 Retardance object
21 Polarization responsive recording medium
22 Retardergram (Recording medium)
23 lens
24 Optical information detector (Imaging Polaremeter)
25 Position where a recorded retardance object
26 Position where an image of a recording medium is formed
27 Polarization generator
27' modulated light
28 Optical signal detector
29 Information source
30 Microlens array
33 Information source
34 Reflection recording/reproduction device
35 Volume recording medium
36 Recording surface of a volume recording medium
51 Recording light generator
52 Recording laser
53 Laser light
54 Polarization modulator
55 Modulated recording light
56 Dielectric body mirror
57 Lens
61 Reproduction light generator
62 Reproduction laser
63 Laser light
64 Polarization modulator
65 Reproduction light
66 Mirror
71 Recording medium
72 Information light
81 Polarimeter
83 Color filter

The invention claimed is:
1. An optical information recording device comprising:
a recording light generator that generates a single recording light that has two mutually orthogonal polarization components having a phase difference therebetween in an arbitrary polarization basis, optical information being included in the phase difference; and
a recording medium in which the optical information is recorded by the recording light,
wherein the recording light generator comprises:
a single recording light laser;
a polarization production unit that produces the two mutually orthogonal polarization components, which orthogonally intersect with each other in an arbitrary polarization basis;
a variable phase difference providing unit that provides the two polarization components which are generated in the polarization production unit with the arbitrary phase difference based on the optical information, as a modulated light; and
a polarization basis converter that converts a polarization basis of a polarization state of the two polariza- tion components in the modulated light according to a material property of the recording medium, and that generates the recording light being formed by one of (i) a combination of linear polarizations with an arbitrary phase difference, (ii) a combination of circular polarizations with an arbitrary phase difference, and (iii) a combination of elliptical polarizations with an arbitrary phase difference, the recording light having a polarization angle that corresponds to the arbitrary phase difference or having an ellipticity of the elliptical polarization that corresponds to the arbitrary phase difference, the polarization angle or the ellipticity of the elliptical polarization controlling a photo-orientation of a material of the recording medium.

2. The optical information recording device of claim 1, wherein the recording medium has a material that includes a photoresponsive molecule which produces photoinduction birefringence based on respondence of a polarization state configured by the two polarization components.

3. An optical information reproduction device comprising:
   a reproduction light generator that generates reproduction light in a polarization state which only has a single polarization component in an arbitrary polarization;
   a recording medium in which optical information is recorded based on a polarization angle of a single recording light or an ellipticity of an elliptical polarization of the single recording light, the single recording light having two polarization components with a phase difference therebetween corresponding to have the polarization angle or the ellipticity of the elliptical polarization, the two polarization components being one of (i) a combination of linear polarizations with an arbitrary phase difference, (ii) a combination of circular polarizations with an arbitrary phase difference, and (iii) a combination of elliptical polarizations with an arbitrary phase difference, the polarization angle or the ellipticity of the elliptical polarization controlling a photo-orientation of a material of the recording material; and
   an optical information detector that detects the recorded optical information by retrieving information light which is configured by one polarization component included in the reproduction light and another polarization component which is generated based on the photo-orientation of the material of the recording medium by irradiating the recording medium with the reproduction light, the one polarization component of the reproduction light being the same component as a first component of the two polarization components, the generated polarization component being the same component as a second component of the two polarization components and having the arbitrary phase difference from the first component, and the recorded optical information being shown by the arbitrary phase difference.

4. The optical information reproduction device of claim 3, wherein the reproduction light generator comprises:
   a reproduction laser; and
   a polarization production unit that produces the reproduction light which only has a single polarization component in an arbitrary polarization basis based on laser light output from the reproduction laser.

5. The optical information reproduction device of claim 3, wherein the optical information detector detects the optical information based on light intensity of the information light obtained by polarization interference, the information light being transmitted from the recording medium by irradiating the reproduction light, the polarization interference interfering with a signal light component and a reference light component included in the information light, the reference light component being the single polarization component in the reproduction light, the signal light component being another polarization component generated in the recording medium by irradiating with the reproduction light.

6. The optical information reproduction device of claim 3, wherein the optical information detector retrieves the optical information based on several light intensity values of the information light obtained by polarization interference with shifting phases of a reference light component, the information light being transmitted from the recording medium by irradiating the reproduction light, the polarization interference interfering with a signal light component and the reference light component included in the information light in each of the phases, the reference light component being the single polarization component in the reproduction light, the signal light component being another polarization component generated in the recording medium by irradiating with the reproduction light.

7. The optical information reproduction device of claim 3, wherein the optical information detector retrieves the optical information based on several light intensity values of the information light obtained by polarization interference with shifting phases of a reference light component, the information light being transmitted from the recording medium by irradiating the reproduction light, the polarization interference interfering with a signal light component and the reference light component included in the information light in each of the phases, the reference light component being the single polarization component in the reproduction light, the signal light component being another polarization component generated in the recording medium by irradiating with the reproduction light, and
   the optical information detector comprises;
      a polarization basis convertor that converts a polarization basis of the information light which is transmitted from the recording medium and includes the two polarization components, the two polarization components being the signal light component and the reference light component;
      a variable phase retarder that provides the two polarization components with a predetermined phase difference;
      a polarization interference unit that overlaps complex amplitude of the two polarization components as a predetermined ratio; and
      a detector that detects each of several intensity light values of the information light which is transmitted though the polarization interference unit.

8. The optical information reproduction device of claim 3, wherein the optical information detector retrieves the optical information based on several light intensity values of the information light obtained by polarization interference with shifting phases of a reference light component, the information light being transmitted from the recording medium by irradiating the reproduction light, the polarization interference interfering with a signal light component and the reference light component included in the information light in each of the phases, the reference light component being the single polarization component in the reproduction light, the signal light component being another polarization component generated in the recording medium by irradiating with the reproduction light, and the recording medium has a three-dimensional birefringence pattern by transmitting the recording light two or more times, and the optical information included in a recorded three-dimensional birefringence pattern is reproduced by transmitting the reproduction light to the recording medium two or more times.

9. The optical information reproduction device of claim 8, wherein the optical information included in the recorded three-dimensional birefringence pattern is retrieved by performing reconfigure of three-dimensional configuration based on projection-slice theorem.

10. An optical information recording method comprising:
generating a single recording light including optical information, the single recording light having two mutually orthogonal polarization components with a phase difference therebetween in an arbitrary polarization basis, the optical information being included in the phase difference; and
irradiating the recording medium with the recording light to record the optical information in the recording medium,
wherein the generating comprises:
producing, via a polarization production unit, the two mutually orthogonal polarization components, which orthogonally intersect with each other in an arbitrary polarization basis;
providing, via a variable phase difference providing unit, the two polarization components which are generated in the polarization production unit with the arbitrary phase difference based on the optical information, as a modulated light; and
converting, via a polarization basis converter, a polarization basis of a polarization state of the two polarization components in the modulated light according to a material property of the recording medium, and that generates the recording light being formed by one of (i) a combination of linear polarizations with an arbitrary phase difference, (ii) a combination of circular polarizations with an arbitrary phase difference, and (iii) a combination of elliptical polarizations with an arbitrary phase difference, the recording light having a polarization angle that corresponds to the arbitrary phase difference or having an ellipticity of the elliptical polarization that corresponds to the arbitrary phase difference, the polarization angle or the ellipticity of the elliptical polarization controlling a photo-orientation of a material of the recording medium.

11. The optical information recording method of claim 10, wherein the polarization basis used during recording of the optical information is the same as the polarization basis used during reproduction of the optical information.

12. The optical information recording method of claim 10, wherein the polarization basis used during recording of the optical information is different from the polarization basis used during reproduction of the optical information, in a region outside of the recording medium.

13. The optical information recording method of claim 10, wherein the polarization basis used during recording and reproduction of the optical information is: one of a combination of a horizontal polarization component and a perpendicular polarization component; a combination of two mutually orthogonal liner polarization components each of which has a predetermined polarization angle (excluding the horizontal polarization and perpendicular polarization); a combination of a right circular polarization component and a left circular polarization component; and a combination of two mutually orthogonal elliptical polarization components each of which has a predetermined angle.

14. The optical information recording method of claim 10, wherein the recording medium has a material that includes a photoresponsive molecule which generates photoinduced birefringence based on respondence of a polarization state formed by the two polarization components.

15. The optical information recording method of claim 14, wherein the photoinduced birefringence of the photoresponsive molecule performs molecular orientation to a direction in which light in a predetermined polarization state is not absorbed, by performing absorption of the light in the predetermined polarization state in the photoresponsive molecule, and has a characteristic that the birefringence which has the principal axis at a polarization angle of the molecular orientation is produced.

16. The optical information recording method of claim 10, wherein the phase difference between the two polarization components is in a range from $-\pi$ to $\pi$.

17. The optical information recording method of claim 10, wherein polarization modulation of the two polarization components is performed by a spatial light modulator.

18. The optical information recording method of claim 10, wherein a three-dimensional birefringence pattern is recorded by irradiating the recording medium with the recording light two or more times.

19. An optical information reproduction method comprising:
outputting reproduction light to a recording medium in which optical information is recorded, the reproduction light only having a single polarization component in an arbitrary polarization basis, the recording medium having the optical information recorded based on a polarization angle of a single recording light or an ellipticity of an elliptical polarization of the single recording light, the single recording light having two polarization components with a phase difference therebetween corresponding to have the polarization angle or the ellipticity of the elliptical polarization, the two polarization components being one of (i) a combination of linear polarizations with an arbitrary phase difference, (ii) a combination of circular polarizations with an arbitrary phase difference, and (iii) a combination of elliptical polarizations with an arbitrary phase difference, the polarization angle or the ellipticity of the elliptical polarization controlling a photo-orientation of a material of the recording material; and
reproducing the optical information which is configured by the single polarization component included in the reproduction light and another polarization component which is generated based on the photo-orientation of the material of the recording medium by irradiating the recording medium with the reproduction light, the one polarization component of the reproduction light being the same component as a first component of the two polarization components, the generated polarization component being the same component as a second component of the two polarization components and having the arbitrary phase difference from the first component, and the recorded optical information being shown by the arbitrary phase difference.

20. The optical information reproduction method of claim 19, wherein the polarization basis used during recording of the optical information is the same as the polarization basis used during reproduction of the optical information.

21. The optical information reproduction method of claim 19, wherein the polarization basis used during recording of the optical information is different from the polarization basis used during reproduction of the optical information, in a region outside of the recording medium.

22. The optical information reproduction method of claim 19, wherein the polarization basis used during recording and reproduction of the optical information is: one of a combination of a horizontal polarization component and a perpendicular polarization component; a combination of two mutually orthogonal liner polarization components each of which has a predetermined polarization angle (excluding the horizontal polarization and perpendicular polarization); a combination of a right circular polarization component and a left circular polarization component; and a combination of two mutually orthogonal elliptical polarization components each of which has a predetermined angle.

23. The optical information reproduction method of claim 19, wherein,
   when a three-dimensional birefringence pattern is recorded, as the optical information, in the recording medium by irradiating the recording medium with the recording light two or more times,
   the optical information included in the three-dimensional birefringence pattern is reproduced by irradiating the recoding medium with the reproduction light two or more times.

24. The optical information reproduction method of claim 23, wherein, the optical information included in the three-dimensional birefringence pattern is retrieved by performing reconfigure of three-dimensional configuration based on projection-slice theorem.

* * * * *